US012677185B2

(12) United States Patent
Zhang

(10) Patent No.: US 12,677,185 B2
(45) Date of Patent: Jul. 7, 2026

(54) DATA PACKET TRANSMISSION METHOD, COMMUNICATION DEVICE, COMPUTER-READABLE STORAGE MEDIUM AND COMPUTER PROGRAM PRODUCT

(71) Applicant: Tencent Technology (Shenzhen) Company Limited, Shenzhen (CN)

(72) Inventor: Zhuoyun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 389 days.

(21) Appl. No.: 18/244,560

(22) Filed: Sep. 11, 2023

(65) Prior Publication Data

US 2023/0422079 A1     Dec. 28, 2023

Related U.S. Application Data

(63) Continuation of application No. PCT/CN2022/136561, filed on Dec. 5, 2022.

(30) Foreign Application Priority Data

Apr. 21, 2022     (CN) .......................... 202210422067.9

(51) Int. Cl.
*H04W 28/02*          (2009.01)
*H04L 12/14*          (2024.01)
(Continued)

(52) U.S. Cl.
CPC ..... *H04W 28/0236* (2013.01); *H04L 12/1407* (2013.01); *H04L 43/062* (2013.01); *H04L 43/0864* (2013.01); *H04L 43/55* (2022.05)

(58) Field of Classification Search
CPC ... H04W 28/0236; H04W 4/24; H04W 24/08; H04W 28/24; H04L 12/1407; H04L 43/062; H04L 43/0864; H04L 43/55; H04L 41/342; H04L 41/5009; H04L 41/5025; H04L 12/14; H04L 41/5029; H04M 15/66
See application file for complete search history.

(56) References Cited

U.S. PATENT DOCUMENTS

2023/0262562 A1* 8/2023 Manithara Vamanan ................... H04W 24/08 370/331
2024/0333623 A1* 10/2024 Chou .................. H04L 12/1407
(Continued)

*Primary Examiner* — Schquita D Goodwin
(74) *Attorney, Agent, or Firm* — ARENTFOX SCHIFF LLP

(57) ABSTRACT

A method includes sending, by an application function network element, a round trip time request of a service flow to a policy control function (PCF) network element, and a first quality of service detection policy is generated and sent, by the PCF network element, to a session management function (SMF) network element. In response to receiving a quality of service detection request, a UPF side round trip time overtime message is generated by the first UPF network element when a current UPF side round trip time of the service flow between a terminal and the first UPF network element exceeds the first UPF side round trip time threshold value. In response to receiving the UPF side round trip time overtime message, a processing mode is determined by the PCF network element for the service flow to meet the round trip time request.

9 Claims, 16 Drawing Sheets

(51) Int. Cl.
    *H04L 43/062*     (2022.01)
    *H04L 43/0864*     (2022.01)
    *H04L 43/55*     (2022.01)

(56)            References Cited

U.S. PATENT DOCUMENTS

2024/0388952 A1* 11/2024 Ke ..................... H04L 43/0864
2025/0133438 A1* 4/2025 Lee ..................... H04L 12/1407

* cited by examiner

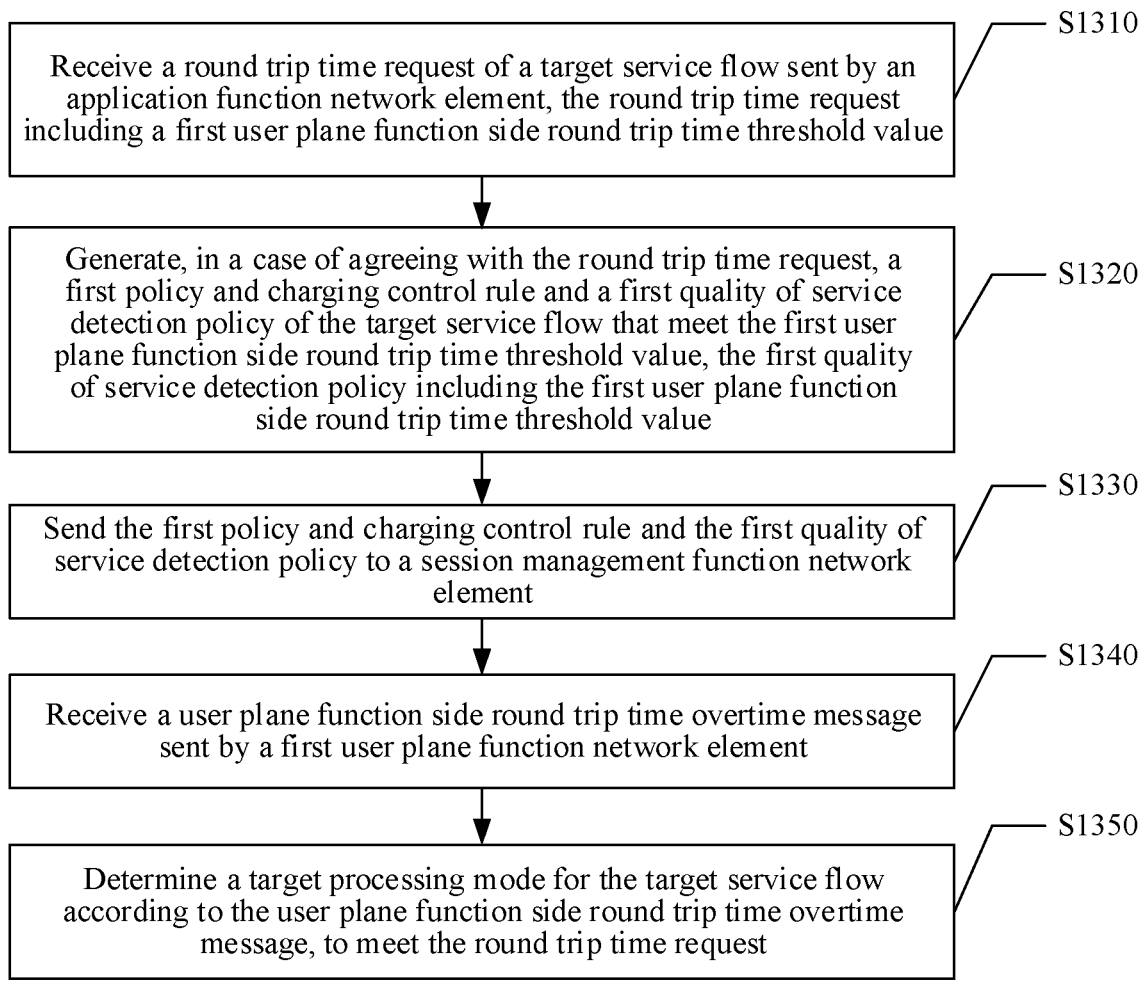

Receive a round trip time request of a target service flow sent by an application function network element, the round trip time request including a first user plane function side round trip time threshold value ⎯ S1310

Generate, in a case of agreeing with the round trip time request, a first policy and charging control rule and a first quality of service detection policy of the target service flow that meet the first user plane function side round trip time threshold value, the first quality of service detection policy including the first user plane function side round trip time threshold value ⎯ S1320

Send the first policy and charging control rule and the first quality of service detection policy to a session management function network element ⎯ S1330

Receive a user plane function side round trip time overtime message sent by a first user plane function network element ⎯ S1340

Determine a target processing mode for the target service flow according to the user plane function side round trip time overtime message, to meet the round trip time request ⎯ S1350

FIG. 13

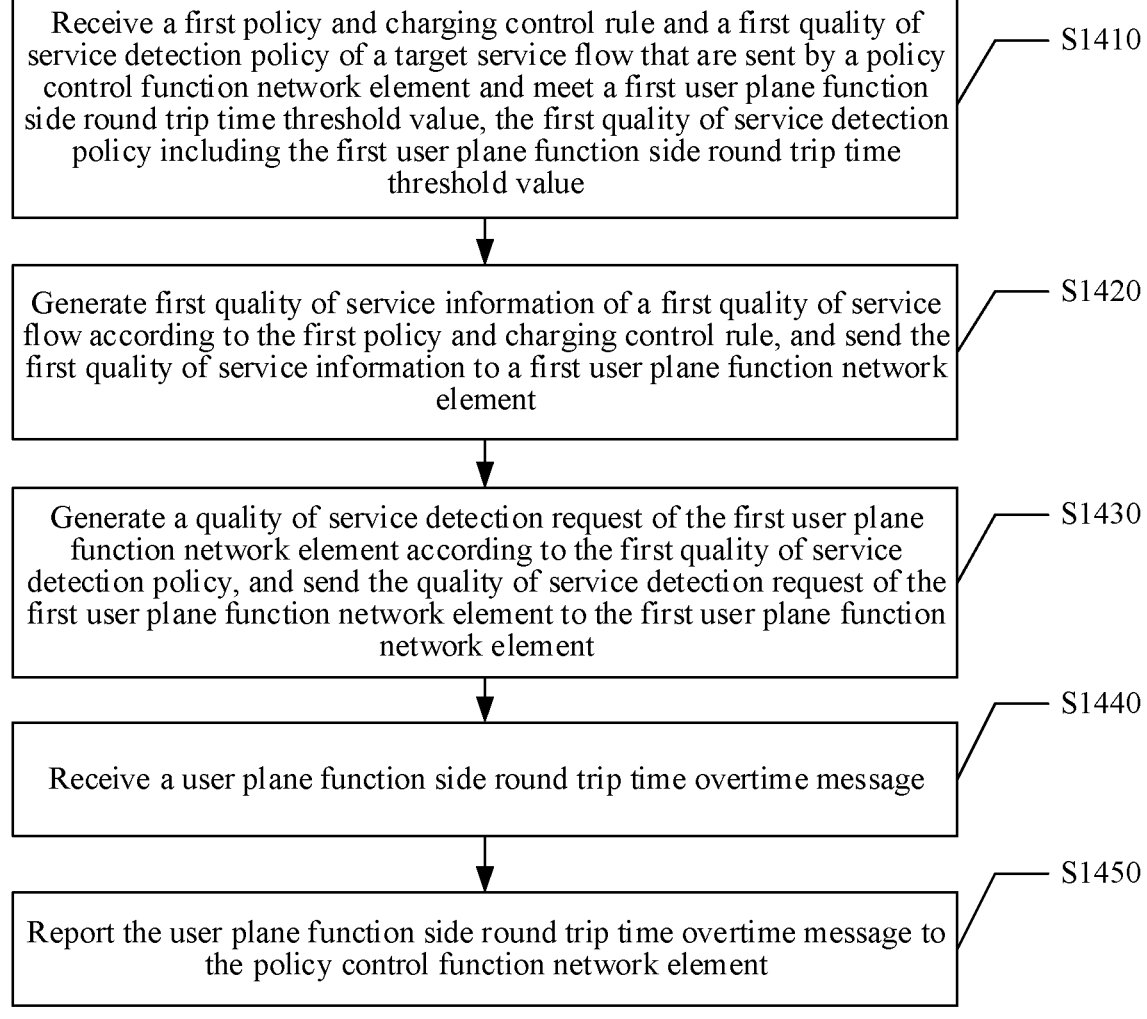

Receive a first policy and charging control rule and a first quality of service detection policy of a target service flow that are sent by a policy control function network element and meet a first user plane function side round trip time threshold value, the first quality of service detection policy including the first user plane function side round trip time threshold value — S1410

Generate first quality of service information of a first quality of service flow according to the first policy and charging control rule, and send the first quality of service information to a first user plane function network element — S1420

Generate a quality of service detection request of the first user plane function network element according to the first quality of service detection policy, and send the quality of service detection request of the first user plane function network element to the first user plane function network element — S1430

Receive a user plane function side round trip time overtime message — S1440

Report the user plane function side round trip time overtime message to the policy control function network element — S1450

FIG. 14

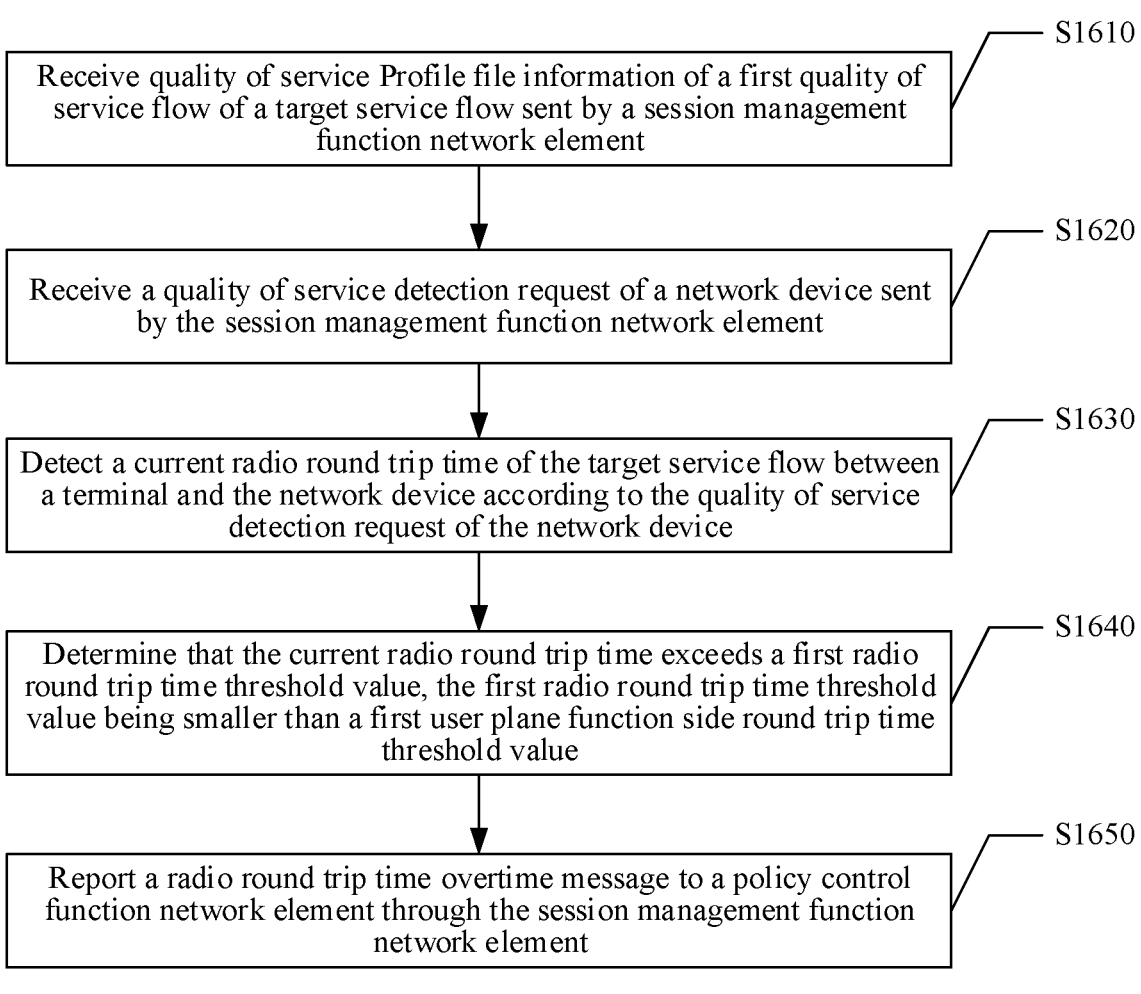

Receive quality of service Profile file information of a first quality of service flow of a target service flow sent by a session management function network element — S1610

Receive a quality of service detection request of a network device sent by the session management function network element — S1620

Detect a current radio round trip time of the target service flow between a terminal and the network device according to the quality of service detection request of the network device — S1630

Determine that the current radio round trip time exceeds a first radio round trip time threshold value, the first radio round trip time threshold value being smaller than a first user plane function side round trip time threshold value — S1640

Report a radio round trip time overtime message to a policy control function network element through the session management function network element — S1650

FIG. 16

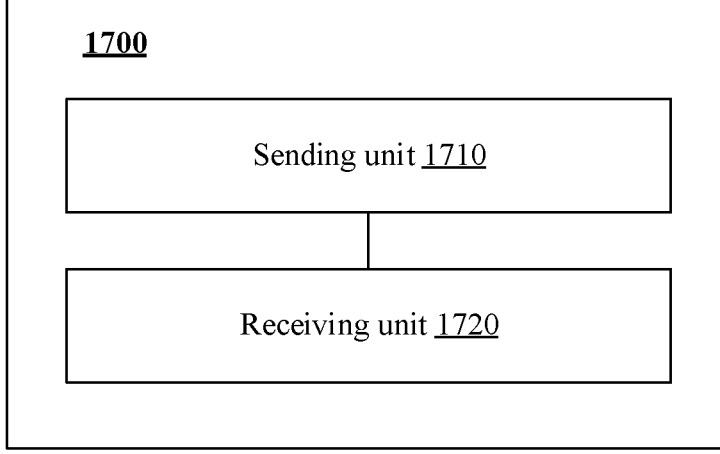

1700

Sending unit 1710

Receiving unit 1720

FIG. 17

DATA PACKET TRANSMISSION METHOD,
COMMUNICATION DEVICE,
COMPUTER-READABLE STORAGE
MEDIUM AND COMPUTER PROGRAM
PRODUCT

RELATED APPLICATIONS

This disclosure is a continuation of International Application No. PCT/CN2022/136561, filed on Dec. 5, 2022, which claims priority to Chinese Patent Application No. 202210422067.9, filed on Apr. 21, 2022. The disclosures of the prior applications are hereby incorporated by reference in their entirety.

FIELD OF THE TECHNOLOGY

This disclosure relates to the technical field of communication, including data packet transmission methods, a communication device, a computer-readable storage medium and a computer program product.

BACKGROUND OF THE DISCLOSURE

In a process of a network for transmitting a data packet, transmission quality of the network may change, which causes that user plane function (UPF) side round trip time (RTT) requirements of a service flow not to be met, thereby causing problems of jamming, lagging and the like in the transmission process of the data packet. For some specific target services, such as augmented reality (AR) and virtual reality (VR), it may even result in the target services being unable to be used in actual scenarios.

SUMMARY

Embodiments of this disclosure provide data packet transmission methods, a communication device, a computer-readable storage medium and a computer program product, which may adjust network transmission for demands of a UPF side round trip time, so as to meet the demands of the UPF side round trip time.

In an embodiment, a data packet transmission method includes sending, by an application function (AF) network element, a round trip time request of a service flow to a policy control function (PCF) network element, the round trip time request including a first user plane function (UPF) side round trip time threshold value. The method also includes receiving, by the AF network element, a response message to the round trip time request, the response message including an indication whether a network exposure function (NEF) network element accepts the round trip time request. In response to the NEF network element accepting the round trip time request, a first quality of service detection policy of the service flow including the first UPF side round trip time threshold value is generated and sent, by the PCF network element, to a session management function (SMF) network element. In response to receiving the first quality of service detection policy, a quality of service detection request is generated by the SMF network element and sent to a first UPF network element. In response to receiving the quality of service detection request, a UPF side round trip time overtime message is generated by the first UPF network element when a current UPF side round trip time of the service flow between a terminal and the first UPF network element exceeds the first UPF side round trip time threshold value. In response to receiving the UPF side round trip time overtime message a processing mode is determined by the PCF network element for the service flow to meet the round trip time request.

In an embodiment, a data packet transmission method includes receiving, by a policy control function (PCF) network element, a round trip time request of a service flow sent by an application function (AF) network element, the round trip time request including a first user plane function (UPF) side round trip time threshold value. The method further includes generating, by the PCF network element, in response to a network exposure function (NEF) network element accepting the round trip time request, a first quality of service detection policy of the service flow that includes the first UPF side round trip time threshold value. The method further includes sending, by the PCF network element, the first quality of service detection policy to a session management function (SMF) network element. In response to receiving the first quality of service detection policy, a quality of service detection request of a first UPF network element is generated and sent by the SMF network element to the first UPF network element. In response to receiving the quality of service detection request of the first UPF network element, a UPF side round trip time overtime message is generated by the first UPF network element when a current UPF side round trip time of the service flow between a terminal and the first UPF network element exceeds the first UPF side round trip time threshold value. In response to receiving the UPF side round trip time overtime message, a processing mode is determined by the PCF network element for the service flow to meet the round trip time request.

In an embodiment, a data packet transmission method includes receiving, by a session management function (SMF) network element, a first quality of service detection policy of a service flow sent by a policy control function (PCF) network element that includes a first user plane function (UPF) side round trip time threshold value. The method further includes generating, by the SMF network element, a quality of service detection request of a first UPF network element according to the first quality of service detection policy, and sending the quality of service detection request to the first UPF network element. The quality of service detection request instructs the first UPF network element to report a UPF side round trip time overtime message when a current UPF side round trip time of the service flow between a terminal and the first UPF network element exceeds the first user plane function side round trip time threshold value. The method further includes receiving, by the SMF network element, the UPF side round trip time overtime message, and reporting, by the SMF network element, the UPF side round trip time overtime message to the PCF network element. In response to receiving the UPF side round trip time overtime message, a processing mode for the service flow is determined by the PCF network element the processing mode meeting a round trip time request sent by an application function (AF) network element to the PCF network element, and the round trip time request including the first UPF side round trip time threshold value.

According to the methods provided in some implementations of this disclosure, the policy control function network element may detect the current user plane function side round trip time through the first user plane function network element, when it is detected that the current user plane function side round trip time cannot meet a first user plane function side round trip time threshold value required by the target service flow through the application function network element, the policy control function network element may ensure the first user plane function side round trip time threshold value required by the target service flow through the target processing mode, so that it is realized that when transmission quality of a network changes, the requirement of user plane function side round trip time of the target service flow may also be ensured, such that the target service flow does not have problems of jamming, lagging and the like in the transmission process, and the network transmission quality of the target service flow is improved.

BRIEF DESCRIPTION OF THE DRAWINGS

FIG. 13 is a flowchart of a data packet transmission method provided by an embodiment of this disclosure.

FIG. 14 is a flowchart of a data packet transmission method provided by an embodiment of this disclosure.

FIG. 16 is a flowchart of a data packet transmission method provided by an embodiment of this disclosure.

FIG. 17 is a block diagram of an application function network element provided by an embodiment of this disclosure.

DESCRIPTION OF EMBODIMENTS

Figures 1, 2:
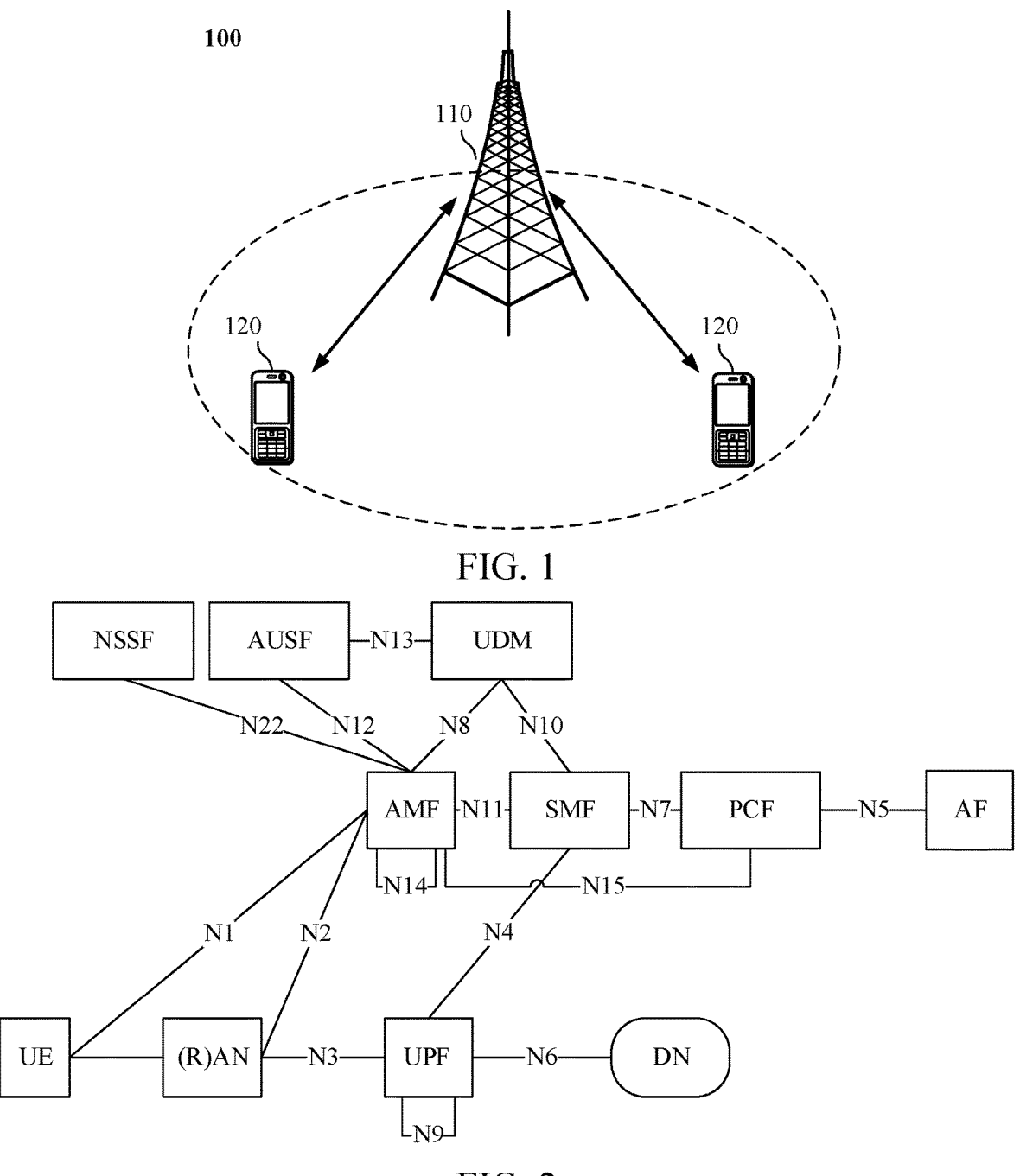
FIG. 1 is a schematic diagram of an architecture of a communication system provided by an embodiment of this disclosure.
FIG. 2 is a system architecture diagram of a 5G network provided by an embodiment of this disclosure.

In order to explain objectives, technical solutions and advantages of this disclosure, exemplary embodiments according to this disclosure will be described in detail below with reference to accompanying drawings. In the accompanying drawings, the same reference numerals represent the same elements from beginning to end. It is to be understood that: the embodiments described here are only illustrative, and are not to be construed as limiting the scope of this disclosure.

The technical solutions of the embodiments of this disclosure may be applied to various communication systems, such as a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD), a universal mobile telecommunication system (UMTS), a worldwide interoperability for microwave access (WiMAX) communication system, a 5th generation partnership project (5G) system, or a future evolving mobile communication system.

Exemplarily, an architecture of a communication system 100 applied in an embodiment of this disclosure is as shown in FIG. 1. The communication system 100 may include a network device 110, and the network device 110 may be a device in communication with a terminal device 120 (or called a communication terminal and a terminal). The network device 110 may provide communication coverage for a specific geographical area, and may communicate with a terminal in the coverage area. The network device 110 may be a bast transceiver station (BTS) in the GSM system or the CDMA system, a NodeB (NB) in the WCDMA system, an evolutional NodeB (eNB or eNodeB) in the LTE system, a base station in the 5G communication system, or a radio controller in a cloud radio access network (CRAN), or the network device may be a mobile switching center, a relay station, an access point, a vehicle-mounted device, a wearable device, a concentrator, a switch, a network bridge, a router, a network side device in a 5G network, or a network device in a future evolving public land mobile network (PLMN).

The communication system 100 further includes at least one terminal device 120 located within a coverage range of the network device 110. The "terminal device" used here includes, but not limited to, connection via a wired line, such as connection via a public switched telephone network (PSTN), a digital subscriber line (DSL), a digital cable and a direct cable; and/or another data connection network; and/or via wireless interfaces, such as a digital television network, a satellite network and an AM-FM broadcast transmitter for a cellular network, a wireless local area network (WLAN) such as a DVB-H network; and/or an apparatus of another terminal set to receive/send communication signals; and/or a device of Internet of Things (IoT). A terminal set to communicate through the wireless interface may be called a "wireless communication terminal", a "wireless terminal" or a "mobile terminal". An example of the mobile terminal includes, but not limited to a satellite or a cellular phone; and a personal communication system (PCS) terminal capable of combining a cellular radiotelephone with data processing, fax and data communication capabilities; and it may include a radiotelephone, a pager, Internet/intranet access, a web browser, notebooks, a calendar and/or a personal digital assistant (PDA) of a global positioning system (GPS) receiver; and a laptop and/or palmtop receiver or other electronic apparatuses including the radiotelephone transceiver. The terminal device may refer to an access terminal, user equipment (UE), a user unit, a user station, a mobile station, a mobile platform, a remote station, a remote terminal, a mobile device, a user terminal, a terminal, a wireless communication device, a user agent or a user apparatus. The access terminal may be a cellular phone, a cordless telephone, a session initiation protocol (SIP) telephone, a wireless local loop (WLL) station, a PDA, a handheld device having a wireless communication function, a computing device or other processing devices connected to a wireless modem, a vehicle-mounted device, a wearable device, a terminal in a 5G network or a terminal in a future evolving PLMN.

In some embodiments, device to device (D2D) communication may be performed among the terminal devices 120.

FIG. 1 exemplarily illustrates one network device and two terminals, for example, a communication system 100 may include a plurality of network devices, and a coverage range of each network device may include the other quantities of terminals, which is not limited in the embodiments of this disclosure.

In some embodiments, the communication system 100 may further include a policy control function network element, an access and mobility management function network element and other network elements, which is not limited in the embodiments of this disclosure.

It is to be understood that a device having a communication function in a network/system in the embodiments of this disclosure may be called a communication device. Taking the communication system 100 shown in FIG. 1 as an example, the communication device may include a network device 110 and a terminal device 120 which have the communication function, and the network device 110 and the terminal device 120 may be specific devices as described above, which will not be repeated here.

It is to be understood that terms "system" and "network" herein may often be interchangeably used herein. A term "and/or" used herein describes only an association relationship for describing associated objects and represents that three relationships may exist. For example, A and/or B may represent three cases: only A exists, both A and B exist, and only B exists.

FIG. 2 is a system architecture diagram of a 5G network provided by an embodiment of this disclosure, as shown in FIG. 2, a device involved in a 5G network system includes: a terminal/user equipment, a radio access network (RAN), a user plane function (UPF) network element, a data network (DN), an access and mobility management function (AMF) network element, a session management function (SMF) network element, a policy control function (PCF) network element, an application function (AF) network element, an authentication server function (AUSF) network element, a unified data management (UDM) network element, and a network slice selection function (NSSF).

Figures 3, 4:
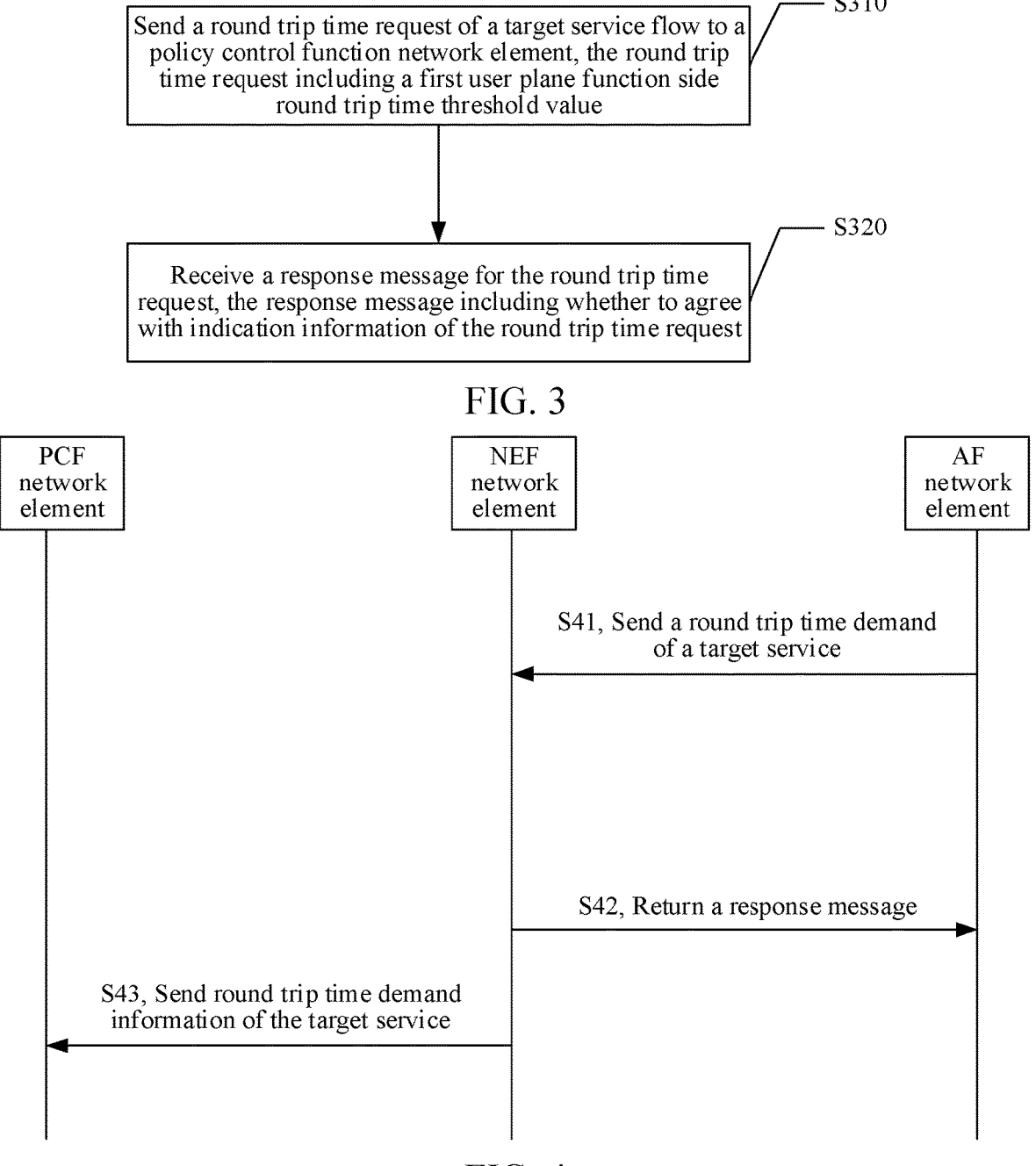
FIG. 3 is a flowchart of a data packet transmission method provided by an embodiment of this disclosure.
FIG. 4 is a schematic interaction diagram of a data packet transmission method provided by an embodiment of this disclosure.

FIG. 3 is a flowchart of a data packet transmission method provided by an embodiment of this disclosure. The method provided by the embodiment of FIG. 3 may be executed by the AF network element, but this disclosure is not limited to this.

As shown in FIG. 3, the method provided by this embodiment of this disclosure may include the following steps:

in step 310, a round trip time request of a target service flow is sent to a policy control function network element, the round trip time request including a first user plane function side round trip time threshold value. For example, a round trip time request of a service flow is sent by an AF network element to a policy control function (PCF) network element, the round trip time request including a first user plane function (UPF) side round trip time threshold value.

In this embodiment of this disclosure, an AF network element may directly send the round trip time request of the target service flow to the PCF network element, or the AF network element may also, for example, indirectly send the round trip time request of the target service flow to the PCF network element through a network exposure function (NEF) network element, the round trip time request is used for the AF network element to propose an RTT requirement for the target service flow to the PCF network element, and the specific RTT requirement may be reflected through the first user plane function side RTT threshold value.

The target service flow refers to a service data flow formed by transmission of a target data packet (which may include at least one of a target uplink data packet and a target downlink data packet) issued by a terminal (hereinafter referred to as UE) and/or a service server for a certain or some target services in a network, the target service may be set according to actual demands, for example, it may be specific services such as AR and VR that require high data rates and short delays.

In this embodiment of this disclosure, RTT refers to round trip time it takes for the target data packet of the target service flow to be sent from one end of the network to the other end of the network, and then returned from the other end of the network to this end of the network.

The user plane function side RTT threshold value refers to a specific threshold value that requires the end-to-end round trip time of the service data flow from the terminal, such as UE, to a UPF network element, to not exceed for a specific target service flow, the specific threshold value may be set according to specific demands of the target service flow, for example, for the target service flow, such as AR or VR, the specific threshold value may be set to be smaller than that of other service flows, so as to meet actual demands of scenarios, such as AR or VR.

The user plane function side RTT threshold value may include a first user plane function side RTT threshold value, and the first user plane function side RTT threshold value refers to a specific threshold value that requires the end-to-end round trip time of the service data flow of the target service flow from the terminal to a first user plane function network element (hereinafter referred to as UPF1) to not exceed.

In an exemplary embodiment, the round trip time request may further include at least one of service flow template information of the target service flow, data network name (DNN) information of the target service flow, and single network slice selection assistance information (S-NSSAI) information.

In an exemplary embodiment, the service flow template information may include one or more of a source network address (a source IP address), a source port number, a destination network address (a destination IP address), a destination port number, a fully qualified domain name (FQDN), an application identity (APP ID) of the target service flow.

In step 320, a response message for the round trip time request is received, the response message including whether to agree with indication information of the round trip time request. For example, a response message to the round trip time request is received by the AF network element, the response message including an indication whether a network exposure function (NEF) network element accepts the round trip time request.

Here, the round trip time request may be used for indicating the policy control function network element to generate, in a case of agreeing with the round trip time request, a first policy and charging control (PCC) rule and a first quality of service (QoS) detection policy of the target service flow that meet the first user plane function side round trip time threshold value, and send the first policy and charging control rule and the first quality of service detection policy to a session management function (SMF) network element. Here, "meet" refers to the first PCC rule and the first QoS detection policy being smaller than or equal to the first user plane function side round trip time threshold value.

The first quality of service detection policy may include a first user plane function side two-way threshold value, or a one-way threshold value split according to the first user plane function side two-way threshold value. If it is the one-way threshold value, it further needs to indicate whether the to-be-detected one-way threshold value is an uplink service flow or a downlink service flow, if the uplink service flow is indicated, the one-way threshold value may be called as an uplink service transmission delay threshold value of a first user plane function side for a first quality of service flow, and if the downlink service flow is indicated, the one-way threshold value may be called as a downlink service transmission delay threshold value of the first user plane function side for the first quality of service flow.

The first policy and charging control rule may be used for indicating the session management function network element to generate first quality of service information of the first quality of service flow, and send the first quality of service information of the first quality of service flow to the first user plane function network element.

The first quality of service detection policy may be used for indicating the session management function network element to generate a quality of service detection request of the first user plane function network element, and send the quality of service detection request of the first user plane function network element to the first user plane function network element. The quality of service detection request of the first user plane function network element may carry contents such as how to perform detection and reporting conditions, for example, it may include the first user plane function side RTT threshold value, and reporting is performed when it is detected that the first user plane function side RTT threshold value is exceeded.

The quality of service detection request of the first user plane function network element may be used for indicating the first user plane function network element to detect a current user plane function side round trip time of the target service flow between a terminal and the first user plane function network element, and report a user plane function side round trip time overtime message in a case that it is determined that the current user plane function side round trip time exceeds the first user plane function side round trip time threshold value.

The user plane function side round trip time overtime message may be used for indicating the policy control function network element to determine a target processing mode for the target service flow, so as to meet the round trip time request.

In this embodiment of this disclosure, the PCF network element may generate the first PCC rule according to the first user plane function side RTT threshold value carried in the round trip time request, and the first PCC rule may be applied in generating the first quality of service information of the first QoS flow, so as to realize transmission of the target service flow through the first QoS flow. The first PCC rule meets the first user plane function side RTT threshold value, which refers to that the first QoS information of the first QoS flow bonded with the first PCC rule meets the first user plane function side RTT threshold value in a QoS rule of the first QoS flow.

In this embodiment of this disclosure, the first PCC rule and the first QoS detection policy may be merged, separated or used as a part of other rules. According to different executing entities, there may be different names, which is not limited in this disclosure.

In an exemplary embodiment, the first policy and charging control rule may include the uplink service transmission delay threshold value and the downlink service transmission delay threshold value of the first user plane function side for the first quality of service flow.

A sum of the uplink service transmission delay threshold value and the downlink service transmission delay threshold value of the first user plane function side for the first quality of service flow may be smaller than or equal to the first user plane function side round trip time threshold value.

The first quality of service flow may meet the uplink service transmission delay threshold value and the downlink service transmission delay threshold value of the first user plane function side for the first quality of service flow in the first quality of service information.

The uplink service transmission delay threshold value of the first user plane function side for the first quality of service flow may be equal or not equal to the downlink service transmission delay threshold value.

In this embodiment of this disclosure, after the PCF network element receives the first user plane function side RTT threshold value sent by the AF network element, the uplink service transmission delay threshold value of the first user plane function side for the first QoS flow and the downlink service transmission delay threshold value of the first user plane function side for the first QoS flow may be split from the first user plane function side RTT threshold value, the sum of the uplink service transmission delay threshold value of the first user plane function side for the first QoS flow and the downlink service transmission delay threshold value of the first user plane function side for the first QoS flow is smaller than or equal to the first user plane function side RTT threshold value, and the uplink service transmission delay threshold value of the first QoS flow may be equal or not equal to the downlink service transmission delay threshold value of the first user plane function side for the first QoS flow.

For example, it is assumed that the first user plane function side RTT threshold value is 20 ms, the uplink service transmission delay threshold value of the first user plane function side for the first QoS flow may be 15 ms, and the downlink service transmission delay threshold value of the first user plane function side for the first QoS flow may be 5 ms. Alternatively, the uplink service transmission delay threshold value of the first user plane function side for the first QoS flow may be 10 ms, and the downlink service transmission delay threshold value of the first user plane function side for the first QoS flow may be 10 ms.

The uplink service transmission delay threshold value of the first user plane function side for the first QoS flow and the downlink service transmission delay threshold value of the first user plane function side for the first QoS flow are split from the first user plane function side RTT threshold value to be used for detecting whether the uplink service transmission delay of the first user plane function side of the target service flow for the first QoS flow exceeds the uplink service transmission delay threshold value of the first user plane function side for the first QoS flow, and whether the downlink service transmission delay of the first user plane function side of the target service flow for the first QoS flow exceeds the downlink service transmission delay threshold value of the first user plane function side for the first QoS flow, so that more accurate detection and optimization of network transmission quality may be realized. At this time, the first PCC rule may include the uplink service transmission delay threshold value of the first user plane function side for the first QoS flow and the downlink service transmission delay threshold value of the first user plane function side for the first QoS flow, such that the SMF network element may generate first QoS information of the first QoS flow according to the first PCC rule to meet the uplink service transmission delay threshold value of the first user plane function side for the first QoS flow and the downlink service transmission delay threshold value of the first user plane function side for the first QoS flow in the QoS rule. Since the sum of the uplink service transmission delay threshold value of the first user plane function side for the first QoS flow and the downlink service transmission delay threshold value of the first user plane function side for the first QoS flow is not greater than the first user plane function side RTT threshold value, the first PCC rule still meets the first user plane function side RTT threshold value.

In an exemplary embodiment, the first QoS detection policy may include the uplink service transmission delay threshold value of the first user plane function side for the first QoS flow and the downlink service transmission delay threshold value of the first user plane function side for the first QoS flow, for example, may further include the first user plane function side RTT threshold value, so that the SMF network element may generate a QoS detection request of the UPF1 according to the first QoS detection policy. The QoS detection request may include the uplink service transmission delay threshold value of the first user plane function side for the first QoS flow and the downlink service transmission delay threshold value of the first user plane function side for the first QoS flow, for example, may further include the first user plane function side RTT threshold value.

The UPF1 may respond to the received QoS detection request of the UPF1 to detect a current uplink service transmission delay of the target service flow between the terminal and the UPF1 and a current downlink service transmission delay of the target service flow between the terminal and the UPF1, for example, it may further detect a current UPF side RTT of the target service flow between the terminal and the UPF1. When it is detected that the current uplink service transmission delay of the target service flow between the terminal and the UPF1 exceeds the uplink service transmission delay threshold value of the first user plane function side for the first QoS flow; and/or, the current downlink service transmission delay of the target service flow between the terminal and the UPF1 exceeds the downlink service transmission delay threshold value of the first user plane function side for the first QoS flow; and/or, the current UPF side RTT of the target service flow between the terminal and the UPF1 exceeds the first user plane function side RTT threshold value, the UPF1 may directly or indirectly report a UPF side RTT overtime message to the PCF network element. The UPF side RTT overtime message may include the current uplink service transmission delay of the target service flow between the terminal and the UPF1 that exceeds the uplink service transmission delay threshold value of the first user plane function side for the first QoS flow, and/or, the current downlink service transmission delay of the target service flow between the terminal and the UPF1 that exceeds the downlink service transmission delay threshold value of the first user plane function side for the first QoS flow, and/or, the current UPF side RTT of the target service flow between the terminal and the UPF1 that exceeds the first user plane function side RTT threshold value, such that the PCF network element may determine the target processing mode, so as to meet the round trip time request proposed by the AF network element.

In an exemplary embodiment, the round trip time request may further include a suggested processing mode after exceeding the first user plane function side round trip time threshold value.

The user plane function side round trip time overtime message may further be used for indicating the policy control function network element to determine the target processing mode for the target service flow according to at least one of the suggested processing mode and a local policy of the policy control function network element.

In this embodiment of this disclosure, the round trip time request directly or indirectly sent by the AF network element to the PCF network element may further include a suggested processing mode provided by the AF network element when it is detected that the current UPF side RTT exceeds the first user plane function side RTT threshold value, and the suggested processing mode may be, for example, at least one of the following:

(1) continuing to transmit the target service flow to report a round trip time overtime message to the application function network element.

For example, the AF network element may suggest the PCF network element to continue to transmit the target service flow when it is learned that the current UPF side RTT between the UE and the UPF1 side exceeds the first user plane function side RTT threshold value, and only report the round trip time overtime message to the AF network element without any other processing. The AF network element is informed that the current UPF side RTT between the UE and the UPF1 side exceeds the first user plane function side RTT threshold value through the round trip time overtime message, for example, the round trip time overtime message may further include the current UPF side RTT between the UE and the UPF1 side that exceeds the first user plane function side RTT threshold value.

(2) Reporting to the application function network element when service degradation occurs.

For example, when the PCF network element increases the first user plane function side RTT threshold value, it reports to the AF network element, and informs the AF network element of the increased user plane function side RTT.

(3) Reporting to the application function network element when the PCF network element adjusts network configuration to meet the round trip time request.

In this embodiment of this disclosure, when the PCF network element adjusts the network configuration to meet the round trip time request, if the round trip time request can be met after adjusting the network configuration, the PCF network element may not report to the AF network element, and may also report to the AF network element.

(4) Interrupting transmission of the target service flow.

For some target service flows with high RTT requirements, if it is detected that the first user plane function side RTT threshold value proposed by the AF network element is not met, the AF network element may also suggest the PCF network element to directly interrupt the transmission of the target service flow.

The suggested processing mode is not limited in this disclosure, and the AF network element may set according to actual demands of the target service flow.

In an exemplary embodiment, the method provided by this embodiment of this disclosure may further include: receiving a round trip time overtime message. The round trip time overtime message may include a current user plane function side round trip time exceeding the first user plane function side round trip time threshold value.

For example, the AF network element may receive the round trip time overtime message from the PCF network element, the round trip time overtime message may be used for informing the AF network element that the current UPF side RTT between the UE and the UPF1 has exceeded the first user plane function side RTT threshold value, for example, the round trip time overtime message may further carry the current UPF side RTT exceeding the first user plane function side RTT threshold value.

According to the data packet transmission method provided by the implementation of this disclosure, the policy control function network element may detect the current user plane function side round trip time through the first user plane function network element, when it is detected that the current user plane function side round trip time cannot meet the first user plane function side round trip time threshold value required by the target service flow through the application function network element, the policy control function network element may ensure the first user plane function side round trip time threshold value required by the target service flow through the target processing mode, so that it is realized that when transmission quality of a network changes, the requirement of user plane function side round trip time of the target service flow may also be ensured, such that the target service flow does not have problems of jamming, lagging and the like in the transmission process, and the network transmission quality of the target service flow is improved.

An embodiment of FIG. 4 shows a schematic diagram of AF interactive service demands. As shown in FIG. 4, the method provided by this embodiment of this disclosure may include the following steps:

in step 41, an AF network element sends a round trip time demand of a target service to an NEF network element.

Here, the round trip time demand may include a first user plane function side RTT threshold value and identification information of AF (represented by AF ID), and the round trip time demand may further include a suggested processing mode after exceeding the first user plane function side RTT threshold value, service flow template information of a target service flow, and DNN and S-NSSAI of the target service flow.

In step 42, the NEF network element returns a response message to the AF network element.

In this embodiment of this disclosure, the AF network element may send a round trip time request of the target service flow to the NEF network element and carry the above round trip time demand in the round trip time request, after receiving the round trip time request sent by the AF network element, the NEF network element may authenticate and certificate the round trip time request to generate the corresponding response message, and return the response message to the AF network element.

The response message may include indication information of whether to agree with the round trip time request, and if the round trip time request passes through authentication and certification, the indication information indicates to agree with the round trip time request; and if the round trip time request does not pass through authentication and certification, the indication information indicates to refuse the round trip time request, for example, it may further include a refuse reason value.

In step 43, the NEF network element sends round trip time demand information of the target service to a PCF network element.

In this embodiment of this disclosure, after the above round trip time request passes through authentication and certification by the NEF network element, the NEF network element may take at least part of the round trip time demand carried in the round trip time request as the round trip time demand information to be sent to the PCF network element. The round trip time demand information may include the first user plane function side RTT threshold value, for example, may further include the suggested processing mode after exceeding the first user plane function side RTT threshold value, the service flow template information of the target service flow, and the DNN and S-NSSAI of the target service flow.

After receiving the round trip time demand information sent by the NEF network element, the PCF network element may generate a first PCC rule and a first QoS detection policy that meet the first user plane function side RTT threshold value according to the round trip time demand information, and then send the first PCC rule and the first QoS detection policy to an SMF network element, the SMF network element generates first quality of service information of a first quality of service flow of the target service flow according to the first PCC rule, and sends the first quality of service information of the first quality of service flow to a first user plane function network element (represented by UPF1 below).

In this embodiment of this disclosure, the SMF network element may generate a service flow template according to the service flow template information of the target service flow. The PCF network element may obtain the service flow template information from the round trip time request sent by the AF network element, and may also obtain the service flow template information in other ways, which is not limited in this disclosure.

In this embodiment of this disclosure, the service flow template may include one or more of a source IP address, a source port number, a destination IP address, a destination port number, an FQDN, an APP ID and an Internet protocol (IP).

According to the data packet transmission method provided by the implementation of this disclosure, the AF network element may send the round trip time request to the NEF network element, by carrying the first user plane function side RTT threshold value, the AF ID, the suggested processing mode after exceeding the first user plane function side RTT threshold value, the service flow template information of the target service flow, and the DNN and S-NSSAI of the target service flow in the round trip time request, the round trip time demand information is directly sent to the PCF network element, and meanwhile, the number of interactions between the AF network element and the NEF network element may be reduced.

In this embodiment of this disclosure, the AF network element may be a function unit abstracted from a service server.

Figures 5, 6:
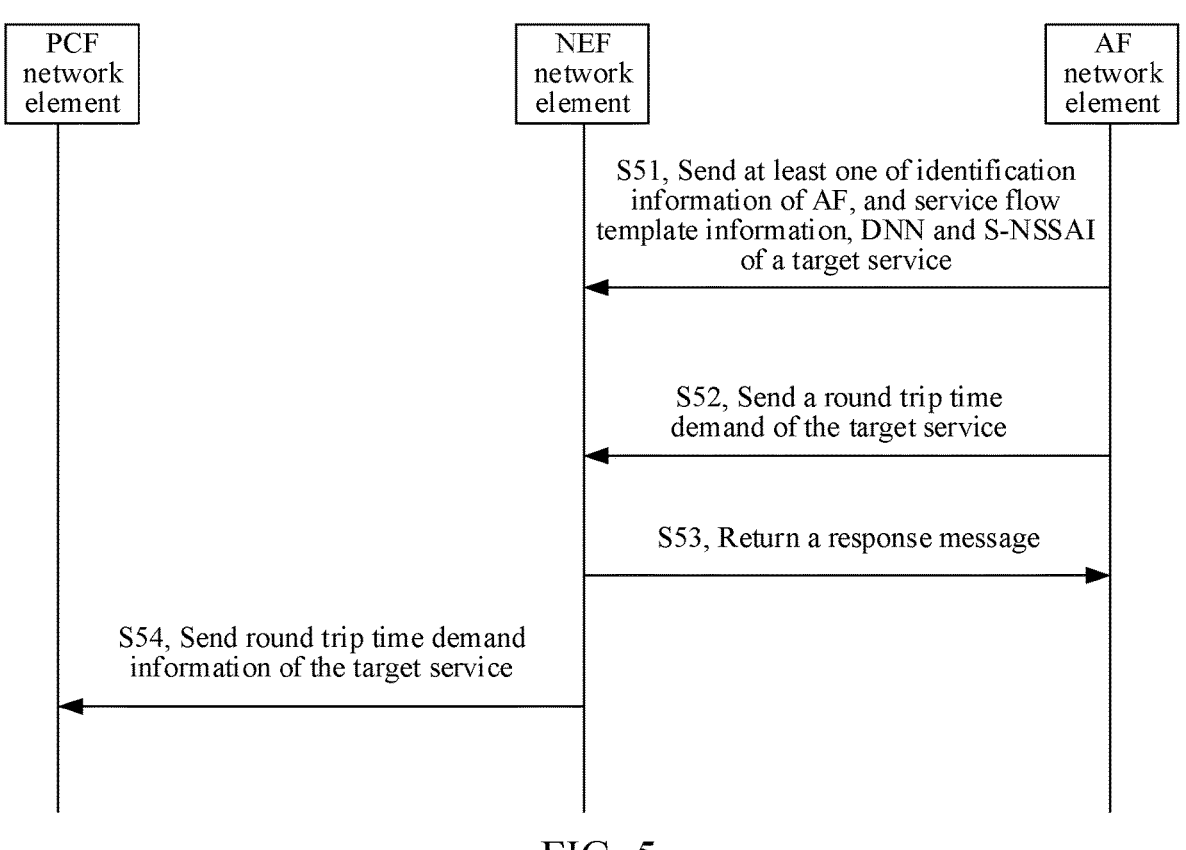
FIG. 5 is a schematic interaction diagram of a data packet transmission method provided by an embodiment of this disclosure.
FIG. 6 is a schematic interaction diagram of a data packet transmission method provided by an embodiment of this disclosure.

FIG. 5 is a schematic interaction diagram of a data packet transmission method provided by an embodiment of this disclosure.

As shown in FIG. 5, the method provided by this embodiment of this disclosure may include the following steps:

in step 51, an AF network element sends at least one of identification information of AF, and service flow template information, DNN and S-NSSAI of a target service to an NEF network element.

The NEF network element receives the AF ID, and at least one of the service flow template information, the DNN information and/or the S-NSSAI of the target service sent by the AF network element, and performs association storage on the AF ID with the at least one of the service flow template information, the DNN information and/or the S-NSSAI of the target service.

In step 52, an AF network element sends a round trip time demand of the target service to the NEF network element.

Here, the AF network element may send the round trip time demand of the target service to the NEF network element through the round trip time request, where, the round trip time demand may include a first user plane function side RTT threshold value, a suggested processing mode after exceeding the first user plane function side RTT threshold value and the AF ID.

After receiving the round trip time request, the NEF network element may authenticate and certificate the round trip time request, after the round trip time request passes through authentication and certification, the NEF network element may search for the above association storage according to the AF ID carried in the round trip time request to obtain at least one of service flow template information, DNN information and/or S-NSSAI of the target service flow.

In step 53, the NEF network element returns a response message to the AF network element.

Here, the response message includes whether to agree with indication information of the round trip time request.

In S54, the NEF network element sends round trip time demand information of the target service to a PCF network element.

Here, the NEF network element may directly or indirectly send the round trip time demand information of the target service to the PCF network element.

Other contents of the embodiment of FIG. 5 may refer to the above embodiment.

According to the data packet transmission method provided by the implementation of this disclosure, the NEF network element may obtain the service flow template information, the DNN information and/or S-NSSAI of the target service flow from the AF network element in advance, the NEF network element may perform association storage on the AF ID with the service flow template information, the DNN information and/or the S-NSSAI of the target service flow, in this way, when the AF network element sends the round trip time request to the NEF network element, the round trip time request may not need to contain the service flow template information, the DNN information and/or the S-NSSAI of the target service flow, but only needs to carry the AF ID, the first user plane function side RTT threshold value and the suggested processing mode after exceeding the first user plane function side RTT threshold value, so that the quantity of data carried in the round trip time request may be reduced, and according to the AF ID carried in the round trip time request, the service flow template information, the DNN information and/or the S-NSSAI of the corresponding target service flow may be searched from the above association storage to be sent to the PCF network element.

As shown in FIG. 6, a method provided by an embodiment of this disclosure may include the following steps:

in step 61, an AF network element sends a round trip time demand of a target service to a PCF network element.

Here, the round trip time demand may include a first user plane function side RTT threshold value, a suggested processing mode after exceeding the first user plane function side RTT threshold value, identification information of AF, service flow template information of a target service flow, DNN and S-NSSAI of the target service flow and the like.

In step 62, the PCF network element returns a response message to the AF network element.

In this embodiment of this disclosure, the AF network element may send a round trip time request to the PCF network element, the round trip time request may carry the above round trip time demand, after receiving the round trip time request sent by the AF network element, the PCF network element may authenticate and certificate the round trip time request to generate the corresponding response message, and return the response message to the AF network element. The response message may include indication information of whether to agree with the round trip time request, and if the round trip time request passes through authentication and certification, the indication information indicates to agree with the round trip time request; and if the round trip time request does not pass through authentication and certification, the indication information indicates to refuse the round trip time request, and it may further include a refuse reason value.

Other contents of the embodiment of FIG. 6 may refer to the above embodiment.

According to the data packet transmission method provided by the implementation of this disclosure, the AF network element may directly send the round trip time request to the PCF network element, and the round trip time request carries the first user plane function side RTT threshold value, the AF ID, the suggested processing mode after exceeding the first user plane function side RTT threshold value, the service flow template information of the target service flow, and the DNN and S-NSSAI of the target service flow, so that the number of interactions between the AF network element and the PCF network element may be reduced.

Figure 7:
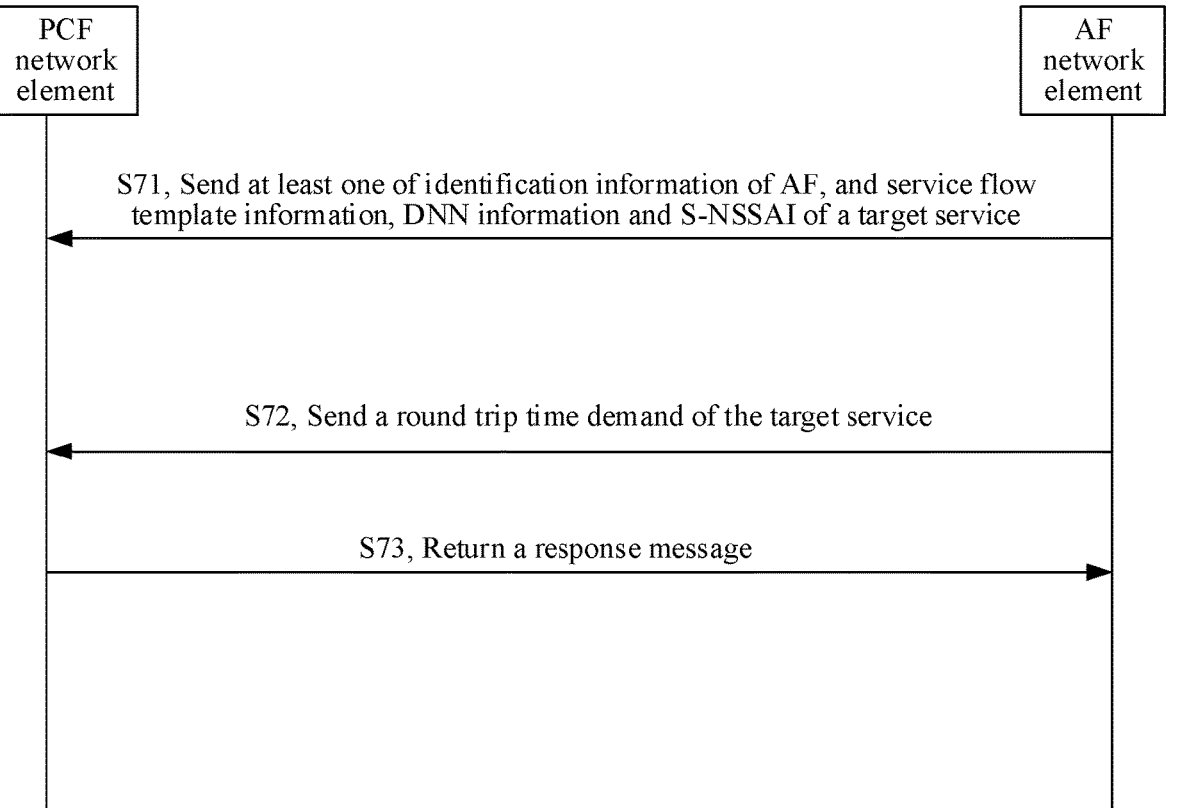
FIG. 7 is a schematic interaction diagram of a data packet transmission method provided by an embodiment of this disclosure.

FIG. 7 is a schematic interaction diagram of a data packet transmission method provided by an embodiment of this disclosure.

As shown in FIG. 7, the method provided by this embodiment of this disclosure may include the following steps:

in step 71, an AF network element sends at least one of identification information of AF, and service flow template information, DNN information and S-NSSAI of a target service to a PCF network element.

The PCF network element receives the AF ID, and at least one of the service flow template information, the DNN information and/or the S-NSSAI of the target service sent by the AF network element, and performs association storage on the AF ID with the at least one of the service flow template information, the DNN information and/or the S-NSSAI of the target service.

In step 72, the AF network element sends a round trip time demand of the target service to the PCF network element.

Here, the round trip time demand may include a first user plane function side RTT threshold value, a suggested processing mode after exceeding the first user plane function side RTT threshold value, and identification information of AF.

After the round trip time request passes through authentication and certification, the PCF network element may search for the above association storage according to the AF ID carried in the round trip time request to obtain service flow template information, DNN information and/or S-NSSAI of a target service flow.

In step 73, the PCF network element returns a response message to the AF network element.

Here, the response message includes whether to agree with indication information of the round trip time request.

Other contents of the embodiment of FIG. 7 may refer to the above embodiment.

According to the data packet transmission method provided by the implementation of this disclosure, on the one hand, the AF network element may directly send the round trip time request to the PCF network element; and on the other hand, the PCF network element may obtain the service flow template information, the DNN information and/or S-NSSAI of the target service flow from the AF network element in advance, the PCF network element may perform association storage on the AF ID with the service flow template information, the DNN information and/or the S-NSSAI of the target service flow. In this way, when the AF network element sends the round trip time request to the PCF network element, the round trip time request may not need to contain the service flow template information, the DNN information and/or the S-NSSAI of the target service flow, but only needs to carry the AF ID, the first user plane function side RTT threshold value and the suggested processing mode after exceeding the first user plane function side RTT threshold value, so that the quantity of data carried in the round trip time request may be reduced, and according to the AF ID carried in the round trip time request, the service flow template information, the DNN information and/or the S-NSSAI of the corresponding target service flow may be searched from the above association storage.

It may be understood that although the embodiments of FIG. 4 to FIG. 7 all take a situation that the AF network element and the PCF network element interact with information directly or indirectly through the NEF network element as an example, this disclosure is not limited to this. In other embodiments, the NEF network element may also store the round trip time demand information requested by the AF in a unified data repository (UDR) network element, and the PCF network element may receive the round trip time demand information from the UDR network element.

Figure 8:
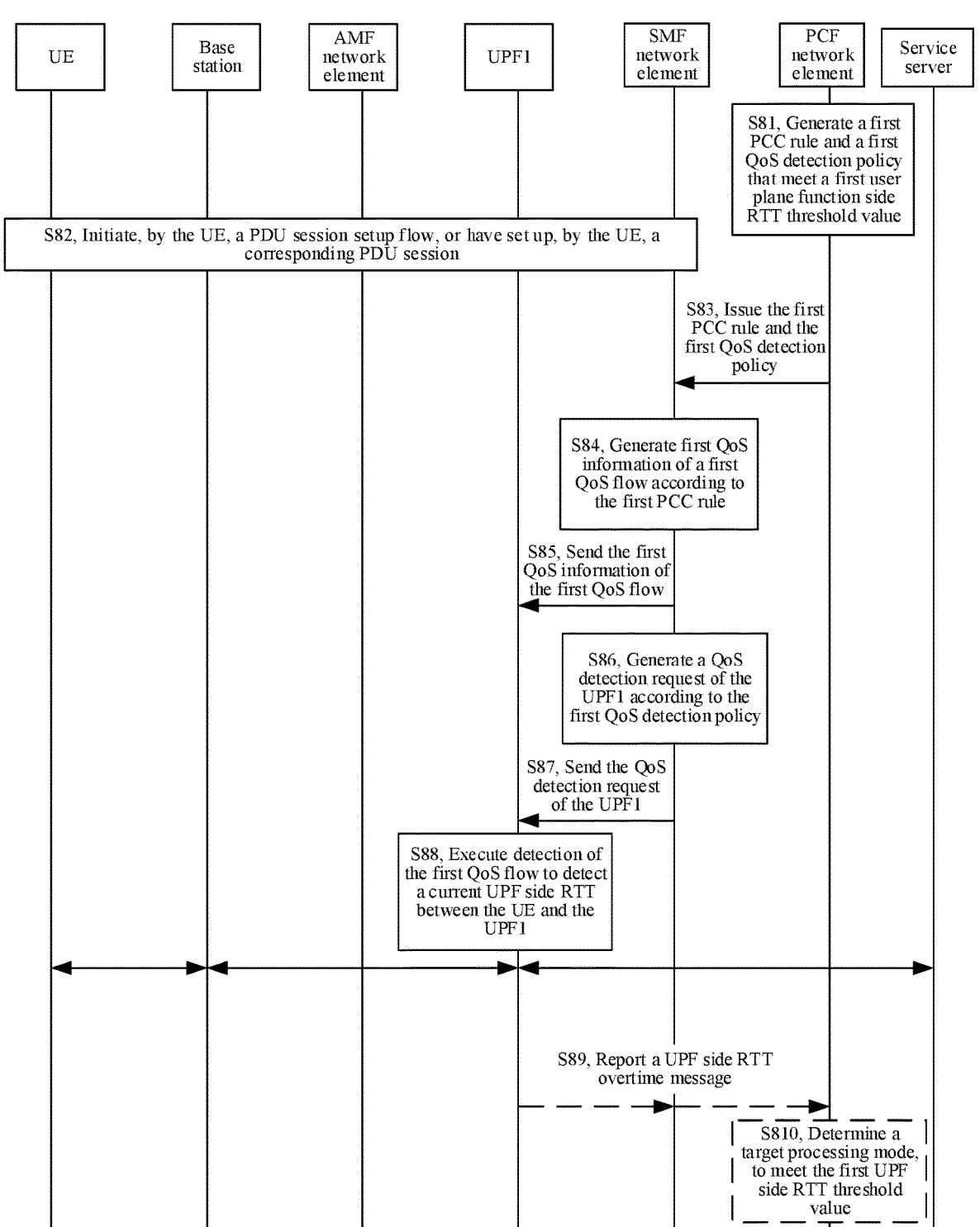
FIG. 8 is a schematic interaction diagram of a data packet transmission method provided by an embodiment of this disclosure.

FIG. 8 shows a schematic diagram of policy execution of a network side. An embodiment of FIG. 8 takes a situation that UE is used as a terminal device, and a base station is used as a network device as an example. As shown in FIG. 8, a method provided by this embodiment of this disclosure may include the following steps:

in step 81, a PCF network element generates a first PCC rule and a first QoS detection policy that meet a first user plane function side RTT threshold value.

In some embodiments, after the PCF network element receives round trip time demand information directly or indirectly sent by an AF network element, the PCF network element may generate the first PCC rule and the first QoS detection policy that meet the first user plane function side RTT threshold value according to the round trip time demand information.

In step 82, the UE initiates a PDU session setup flow, or the UE has set up a corresponding PDU session.

In this embodiment of this disclosure, the UE has set up the PDU session (such as a specific target DNN, and target S-NSSAI) of a target service, or the UE initiates the PDU session setup flow (such as for the specific target DNN, and the target S-NSSAI) of the target service. In S82, an SMF network element may select a UPF1.

In step 83, the PCF network element issues the first PCC rule and the first QoS detection policy to the SMF network element.

In step 84, the SMF network element generates first QoS information of a first QoS flow according to the first PCC rule.

In step 85, the SMF network element sends the first QoS information of the first QoS flow to the UPF1 associated with the first QoS flow.

The UPF1 receives the first QoS information of the first QoS flow sent by the SMF network element and executes the first QoS information on the target service of the first QoS flow.

In step 86, the SMF network element generates a QoS detection request of the UPF1 according to the first QoS detection policy.

Here, the QoS detection request of the UPF1 may include the first user plane function side RTT threshold value.

In step 87, the SMF network element sends the QoS detection request of the UPF1 to the UPF1 associated with the first QoS flow.

In step 88, the UPF1 executes detection of the first QoS flow to detect a current UPF side RTT between the UE and the UPF1.

For example, the UPF1 sends a target downlink data packet (which may be a detection packet used for detecting the current UPF side RTT) of a target service flow, stamps timestamp of the UPF1 sending the target downlink data packet, and then sends the target downlink data packet to the base station, and the base station receives the target downlink data packet, stamps timestamp of the base station receiving the target downlink data packet, then sends the target downlink data packet to the UE, and stamps timestamp of the UE receiving the target downlink data packet. Then the UE uses the target downlink data packet stamped with the timestamp of the UE receiving the target downlink data packet as a target uplink data packet to be sent to the base station, then the base station stamps timestamp of the base station receiving the target uplink data packet, and returns the target uplink data packet to the UPF1, and the UPF1 may calculate the current UPF side RTT according to current time of receiving the target uplink data packet and the timestamp on the target uplink data packet.

This disclosure does not limit the mode of the UPF1 to detect and obtain the current UPF side RTT between the UE and the UPF1.

In step 89, the UPF1 may report a UPF side RTT overtime message to the PCF network element through the SMF network element.

In some embodiments, when the UPF1 detects that the current UPF side RTT between the UE and the UPF1 exceeds the first user plane function side RTT threshold value, the UPF1 may report the UPF side RTT overtime message to the PCF network element through the SMF network element.

In S810, the PCF network element determines a target processing mode to meet the first UPF side RTT threshold value.

According to the data packet transmission method provided by the implementation of this disclosure, the PCF network element may detect the current UPF side RTT through the UPF1, when it is detected that the current UPF side RTT cannot meet the first user plane function side RTT threshold value of the target service flow required by the AF network element, the PCF network element may determine the target processing mode to ensure the first user plane function side RTT threshold value required by the target service flow, so that a situation that when transmission quality of a network changes, a requirement of the user plane function side round trip time of the target service flow may also be ensured is realized, such that the target service flow does not have problems of jamming and lagging in a transmission process, and the network transmission quality of the target service flow is improved.

Figure 9:
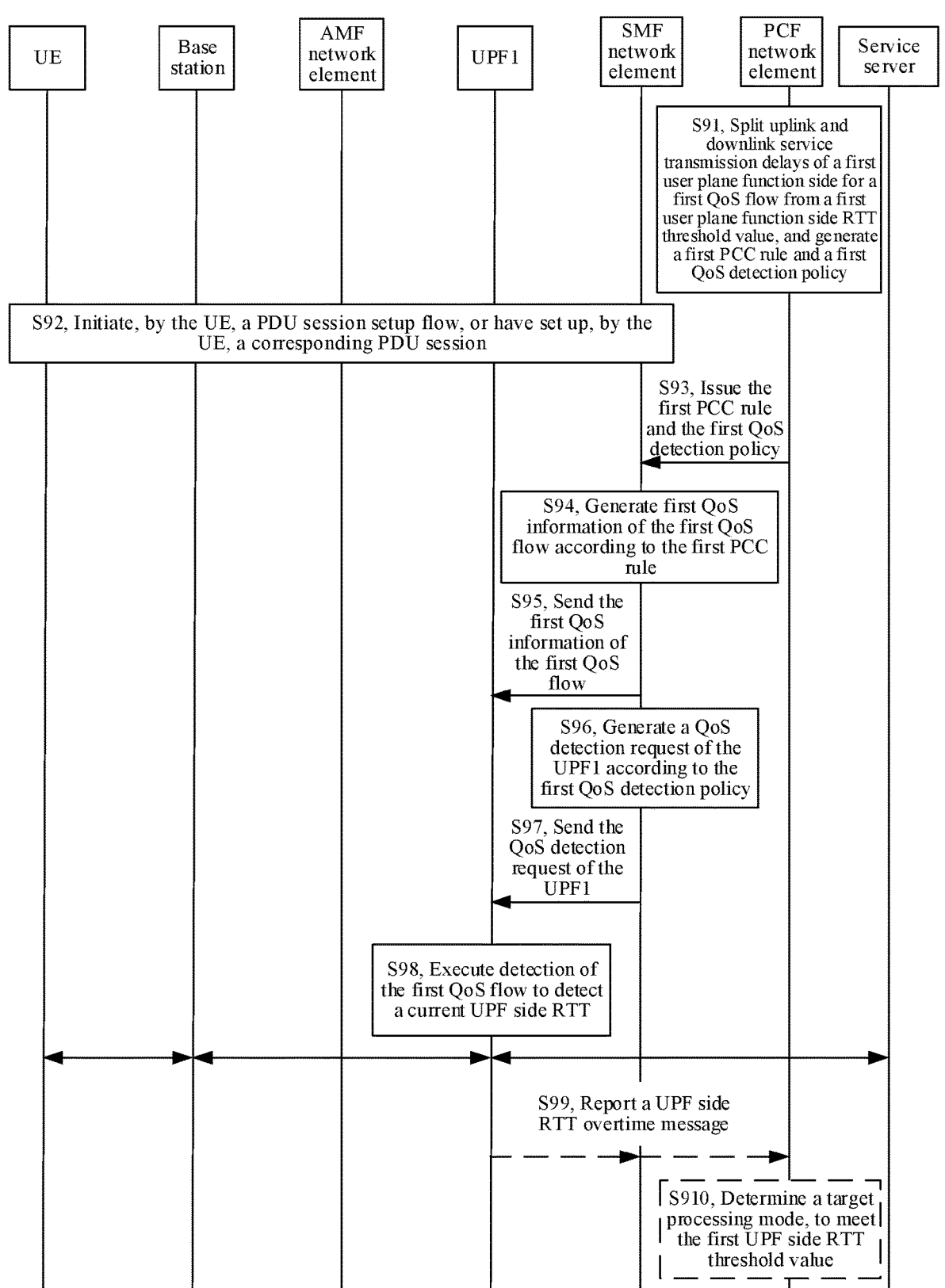
FIG. 9 is a schematic interaction diagram of a data packet transmission method provided by an embodiment of this disclosure.

As shown in FIG. 9, a method provided by an embodiment of this disclosure may include the following steps:

in step 91, a PCF network element splits uplink and downlink service transmission delays of a first user plane function side for a first QoS flow from a first user plane function side RTT threshold value, and generates a first PCC rule and a first QoS detection policy.

In some embodiments, after the PCF network element receives round trip time demand information directly or indirectly sent by an AF network element, the PCF network element may split an uplink service transmission delay threshold value of the first user plane function side for the first QoS flow and a downlink service transmission delay threshold value of the first user plane function side for the first QoS flow from the first user plane function side RTT threshold value in the round trip time demand information, and generate the first PCC rule and the first QoS detection policy that meet the first user plane function side RTT threshold value, where, the first PCC rule may include the uplink service transmission delay threshold value of the first user plane function side for the first QoS flow and the downlink service transmission delay threshold value of the first user plane function side for the first QoS flow.

In this embodiment of this disclosure, the uplink service transmission delay threshold value of the first user plane function side for the first QoS flow may be not equal to the downlink service transmission delay threshold value of the first user plane function side for the first QoS flow, specifically how to split the first user plane function side RTT threshold value may be considered according to network routing, network policies, service demands, network conditions and other factors, which is not limited in this disclosure. In this embodiment of this disclosure, by splitting the first user plane function side RTT threshold value into unequal or equal parts, the network policies may be flexibly configured according to the network conditions.

In step 92, UE initiates a PDU session setup flow, or the UE has set up a corresponding PDU session.

In this embodiment of this disclosure, the UE has set up the PDU session (such as a specific target DNN, and target S-NSSAI) of a target service, or the UE initiates the PDU session setup flow (such as for the specific target DNN, and the target S-NSSAI) of the target service.

In step 93, the PCF network element issues the first PCC rule and the first QoS detection policy to an SMF network element.

In step 94, the SMF network element generates first QoS information of a first QoS flow according to the first PCC rule.

Here, the first QoS information of the first QoS flow meets the uplink service transmission delay threshold value and the downlink service transmission delay threshold value of the first user plane function side for the first QoS flow in a QoS rule.

In step 95, the SMF network element sends the first QoS information of the first QoS flow to a UPF1.

The UPF1 receives the first QoS information of the first QoS flow sent by the SMF network element.

In step 96, the SMF network element generates a QoS detection request of the UPF1 according to the first QoS detection policy.

Here, the QoS detection request of the UPF1 may include the first user plane function side RTT threshold value.

In step 97, the SMF network element sends the QoS detection request of the UPF1 to the UPF1.

In step 98, the UPF1 executes detection of the first QoS flow to detect a current UPF side RTT.

In step 99, the UPF1 may report a UPF side RTT overtime message to the PCF network element through the SMF network element.

In step 910, the PCF network element determines a target processing mode to meet the first user plane function side RTT threshold value.

Other contents of the embodiment of FIG. 9 may refer to the above embodiment.

According to the data packet transmission method provided by the implementation of this disclosure, after the PCF network element receives round trip time demand information directly or indirectly sent by the AF network element, the PCF network element may split the uplink service transmission delay threshold value of the first user plane function side for the first QoS flow and the downlink service transmission delay threshold value of the first user plane function side for the first QoS flow from the first user plane function side RTT threshold value in the round trip time demand information, so that the PCF network element may generate the first PCC rule and the first QoS detection policy that meet the first user plane function side RTT threshold value, where, the first PCC rule may include the uplink service transmission delay threshold value of the first user plane function side for the first QoS flow and the downlink service transmission delay threshold value of the first user plane function side for the first QoS flow, such that the SMF network element may generate the first QoS information of the first QoS flow that meets the uplink service transmission delay threshold value and the downlink service transmission delay threshold value of the first user plane function side for the first QoS flow according to the first PCC rule.

Figure 10:
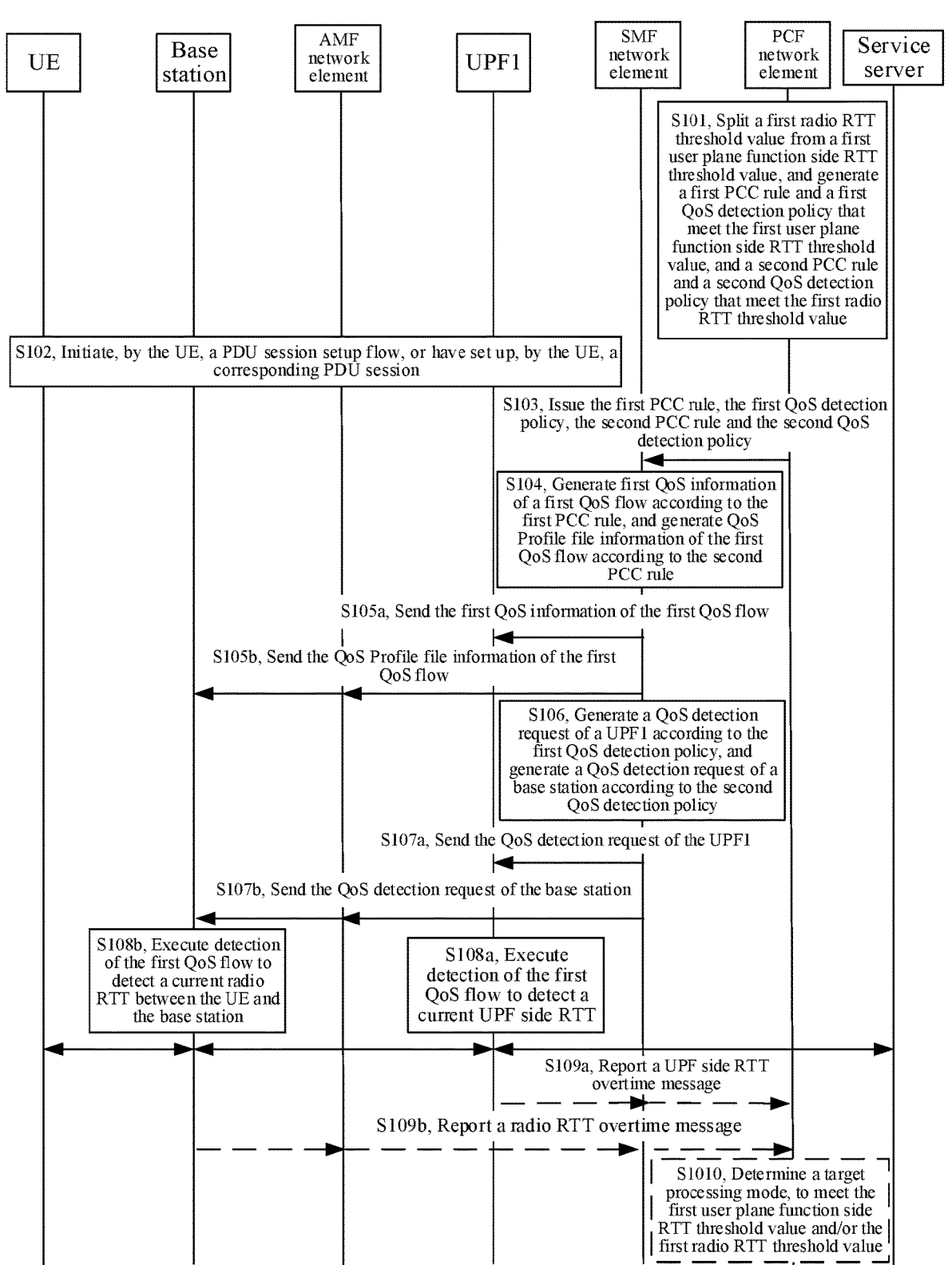
FIG. 10 is a schematic interaction diagram of a data packet transmission method provided by an embodiment of this disclosure.

As shown in FIG. 10, a method provided by an embodiment of this disclosure may include the following steps:

in step 101, a PCF network element splits a first radio RTT threshold value from a first user plane function side RTT threshold value, and generates a first PCC rule and a first QoS detection policy that meet the first user plane function side RTT threshold value, and a second PCC rule and a second QoS detection policy that meet the first radio RTT threshold value.

In this embodiment of this disclosure, the first radio RTT threshold value is smaller than the first user plane function side RTT threshold value.

Specifically how to split and obtain the first radio RTT threshold value from the first user plane function side RTT threshold value by the PCF network element may be considered according to network routing, network policies, service demands, network conditions and the like.

For example, if a delay of a core network is small, and the first user plane function side RTT threshold value is 20 ms, the first radio RTT threshold value between UE and a base station may be set as 15 ms; and if the delay of the core network is large, the first radio RTT threshold value may be split into 10 ms.

In step 102, the UE initiates a PDU session setup flow, or the UE has set up a corresponding PDU session.

In this embodiment of this disclosure, the UE has set up the PDU session (such as a specific target DNN, and target S-NSSAI) of a target service, or the UE initiates the PDU session setup flow (such as for the specific target DNN, and the target S-NSSAI) of the target service.

In step 103, the PCF network element issues the first PCC rule, the first QoS detection policy, the second PCC rule and the second QoS detection policy to an SMF network element.

In this embodiment of this disclosure, the second PCC rule and the second QoS detection policy may be parts of the first PCC rule and the first QoS detection policy respectively, and may be different parts of a rule, which is not limited in this disclosure.

In step 104, the SMF network element generates first QoS information of a first QoS flow according to the first PCC rule, and generates QoS Profile file information of the first QoS flow according to the second PCC rule.

Here, the QoS Profile file information of the first QoS flow may include the first radio RTT threshold value.

Exemplarily, the SMF network element may determine and send QoS Profile file information of the first QoS flow of the target service flow according to the second PCC rule, the SMF network element may send the QoS Profile file information of the first QoS flow to the base station, such that the base station configures the first QoS flow based on the QoS Profile file information of the first QoS flow, and schedules the UE to perform transmission of a target data packet of the target service flow corresponding to the first QoS flow.

In step 105a, the SMF network element sends the first QoS information of the first QoS flow to a UPF1.

The UPF1 receives the first QoS information of the first QoS flow sent by the SMF network element.

In step 105b, the SMF network element sends the QoS Profile file information of the first QoS flow to the base station.

In some other embodiments, the SMF network element may also send updated QoS Profile file information of the first QoS flow to the base station.

In step 106, the SMF network element generates a QoS detection request of the UPF1 according to the first QoS detection policy, and generates a QoS detection request of the base station according to the second QoS detection policy.

In step 107a, the SMF network element sends the QoS detection request of the UPF1 to the UPF1.

In step 107b, the SMF network element sends the QoS detection request of the base station to the base station.

In step 108a, the UPF1 executes detection of the first QoS flow to detect a current UPF side RTT.

In step 108b, the base station executes detection of the first QoS flow to detect a current radio RTT between the UE and the base station.

In this embodiment of this disclosure, the base station may detect the current radio RTT between the UE and the base station according to the received timestamp carried on a target uplink data packet or a target downlink data packet, but this disclosure does not limit a mode of the base station for detecting the current radio RTT.

In step 109a, the UPF1 reports a UPF side RTT overtime message to the PCF network element through the SMF network element.

In step 109b, when the base station detects that the current radio RTT exceeds a first radio RTT threshold value, the radio RTT overtime message may be reported to the PCF network element sequentially through an AMF network element and the SMF network element.

In step 1010, the PCF network element determines a target processing mode to meet the first user plane function side RTT threshold value and/or the first radio RTT threshold value.

Exemplarily, when the PCF network element receives the reported UPF side RTT overtime message and/or the radio RTT overtime message, the PCF network element may determine the target processing mode according to the UPF side RTT overtime message and/or the radio RTT overtime message, so as to meet the first user plane function side RTT threshold value and/or the first radio RTT threshold value.

Other contents of the embodiment of FIG. 10 may refer to other embodiments.

According to the data packet transmission method provided by the implementation of this disclosure, after the PCF network element receives round trip time demand information directly or indirectly sent by the AF network element, the PCF network element may split the first radio RTT threshold value from the first user plane function side RTT threshold value in the round trip time demand information, and generate the first PCC rule and the first QoS detection policy that meet the first user plane function side RTT threshold value, and the second PCC rule and the second QoS detection policy that meet the first radio RTT threshold value, so that the SMF network element may further generate the QoS detection request sent to the UPF1 according to the first PCC rule and the first QoS detection policy, and the QoS detection request sent to the base station according to the second PCC rule and the second QoS detection policy respectively, whether the current UPF side RTT between the UE and the UPF1 exceeds the first user plane function side RTT threshold value may be detected, and whether the current radio RTT between the UE and the base station exceeds the first radio RTT threshold value may further be detected.

Figure 11:
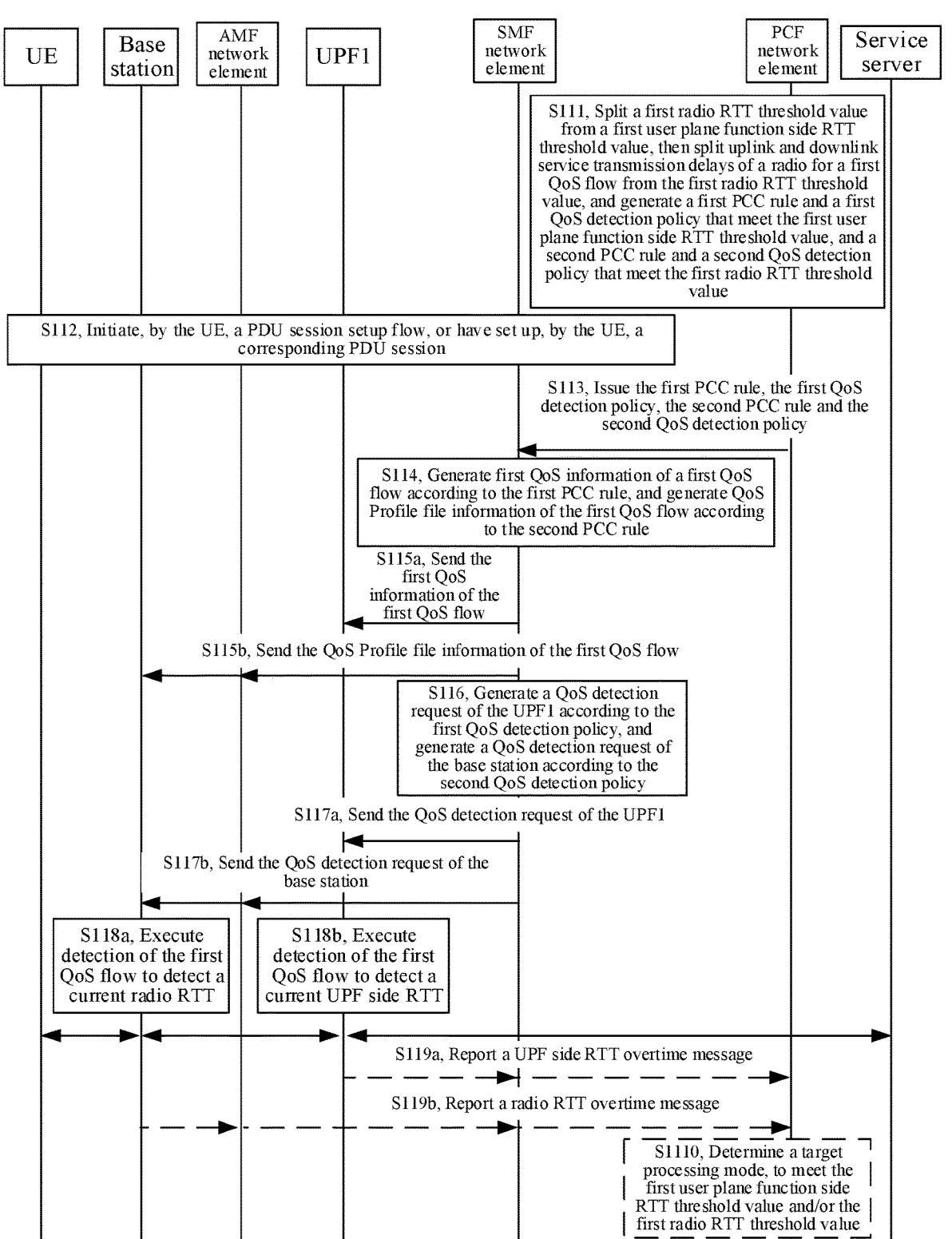
FIG. 11 is a schematic interaction diagram of a data packet transmission method provided by an embodiment of this disclosure.

As shown in FIG. 11, a method provided by an embodiment of this disclosure may include the following steps:

in step 111, a PCF network element splits a first radio RTT threshold value from a first user plane function side RTT threshold value, then splits uplink and downlink service transmission delay threshold values of a radio for a first QoS flow from the first radio RTT threshold value, and generates a first PCC rule and a first QoS detection policy that meet the first user plane function side RTT threshold value, and a second PCC rule and a second QoS detection policy that meet the first radio RTT threshold value.

Here, the second PCC rule may include the uplink service transmission delay threshold value and the downlink service transmission delay threshold value of the radio for the first QoS flow.

Although the embodiment of FIG. 11 takes a situation that the PCF network element splits the first radio RTT threshold value into the uplink service transmission delay threshold value and the downlink service transmission delay threshold value of the radio for the first QoS flow as an example for illustration, this disclosure is not limited to this. In other embodiments, the PCF network element may also send the first radio RRT threshold value to a network device, such as a base station, and the base station splits the first radio RTT threshold value into the uplink service transmission delay threshold value and the downlink service transmission delay threshold value of the radio for the first QoS flow.

In step 112, UE initiates a PDU session setup flow, or the UE has set up a corresponding PDU session.

In this embodiment of this disclosure, the UE has set up the PDU session (such as a specific target DNN, and target S-NSSAI) of a target service, or the UE initiates the PDU session setup (such as for the specific target DNN, and the target S-NSSAI) of the target service.

In step 113, the PCF network element issues the first PCC rule, the first QoS detection policy, the second PCC rule and the second QoS detection policy to an SMF network element.

In step 114, the SMF network element generates first QoS information of a first QoS flow according to the first PCC rule, and generates QoS Profile file information of the first QoS flow according to the second PCC rule.

Here, the first QoS flow meets the uplink service transmission delay threshold value and the downlink service transmission delay threshold value of the radio for the first QoS flow in the QoS Profile file information.

In step 115a, the SMF network element sends the first QoS information of the first QoS flow to a UPF1.

The UPF1 receives the first QoS information of the first QoS flow sent by the SMF network element.

In step 115b, the SMF network element sends the QoS Profile file information of the first QoS flow to the base station.

In step 116, the SMF network element generates a QoS detection request of the UPF1 according to the first QoS detection policy, and generates a QoS detection request of the base station according to the second QoS detection policy.

In step 117a, the SMF network element sends the QoS detection request of the UPF1 to the UPF1.

The QoS detection request of the UPF1 may include a first user plane function side RTT threshold value, and relevant indication information for performing reporting when it is detected that the first user plane function side RTT threshold value is exceeded.

In step 117b, the SMF network element sends the QoS detection request of the base station to the base station.

The QoS detection request of the base station may include a first radio RTT threshold value, and relevant indication information for performing reporting when it is detected that the first radio RTT threshold value is exceeded.

In step 118b, the UPF1 executes detection of the first QoS flow to detect a current UPF side RTT.

In step 118a, the base station executes detection of the first QoS flow to detect a current radio RTT.

In step 119a, the UPF1 reports a UPF side RTT overtime message to the PCF network element through the SMF network element.

In step 119b, when the base station detects that the current radio RTT exceeds the first radio RTT threshold value, the radio RTT overtime message is reported to the PCF network element sequentially through an AMF network element and the SMF network element.

For example, the current radio RTT may include a current radio uplink delay and a current radio downlink delay, when it is detected that the current radio uplink delay exceeds the uplink service transmission delay threshold value of the radio for the first QoS flow, and/or, when it is detected that the current radio downlink delay exceeds the downlink service transmission delay threshold value of the radio for the first QoS flow, the base station may report the radio RTT overtime message to the PCF network element, and the radio RTT overtime message may include the current radio uplink delay and/or the current radio downlink delay.

In step 1110, the PCF network element determines a target processing mode to meet the first user plane function side RTT threshold value and/or the first radio RTT threshold value.

Other contents of the embodiment of FIG. 11 may refer to other embodiments.

According to the data packet transmission method provided by the implementation of this disclosure, after the PCF network element receives round trip time demand information directly or indirectly sent by an AF network element, the PCF network element may split the first radio RTT threshold value from the first user plane function side RTT threshold value, may further split the uplink service transmission delay threshold value and the downlink service transmission delay threshold value of the radio for the first QoS flow from the first radio RTT threshold value, and further generate the second PCC rule and the second QoS detection policy that meet the first radio RTT threshold value, where, the second PCC rule may include the uplink service transmission delay threshold value and the downlink service transmission delay threshold value of the radio for the first QoS flow.

In an exemplary embodiment, after the PCF network element receives the round trip time demand information directly or indirectly sent by the AF network element, the PCF network element may split the uplink service transmission delay threshold value and the downlink service transmission delay threshold value of the first user plane function side for the first quality of service flow from the first user plane function side RTT threshold value, may also split the first radio RTT threshold value from the first user plane function side RTT threshold value at the same time, and may further split the uplink service transmission delay threshold value and the downlink service transmission delay threshold value of the radio for the first QoS flow from the first radio RTT threshold value. Other contents may refer to the above embodiment.

Figure 12:
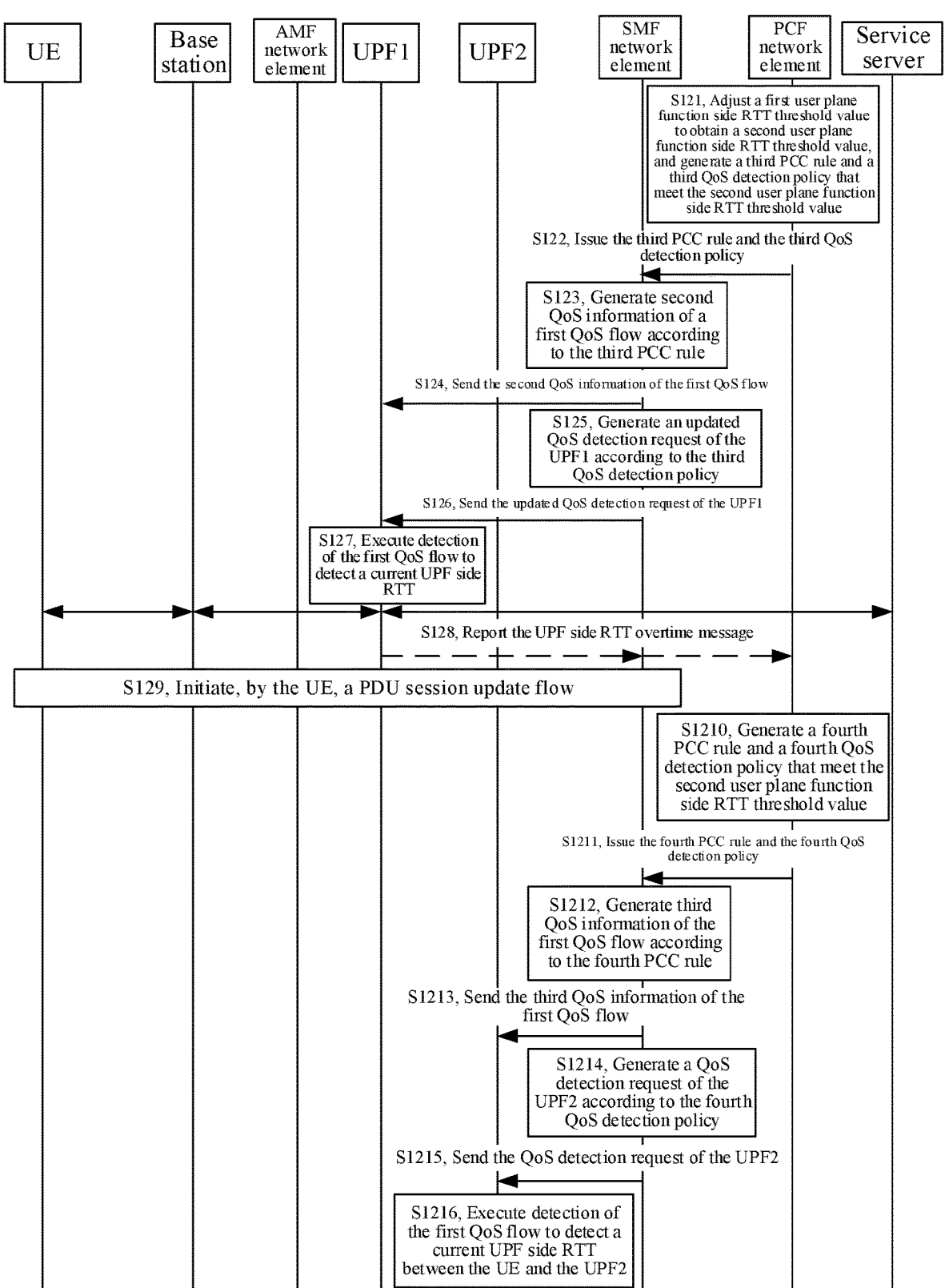
FIG. 12 is a schematic interaction diagram of a data packet transmission method provided by an embodiment of this disclosure.

As shown in FIG. 12, a method provided by an embodiment of this disclosure may include the following steps:

in step 121, a PCF network element adjusts a first user plane function side RTT threshold value to obtain a second user plane function side RTT threshold value, and generates a third PCC rule and a third QoS detection policy that meet the second user plane function side RTT threshold value.

Here, the second user plane function side RTT threshold value is greater than the first user plane function side RTT threshold value.

In step 122, the PCF network element issues the third PCC rule and the third QoS detection policy to an SMF network element.

In step 123, an SMF network element generates second QoS information of a first QoS flow according to the third PCC rule.

In step 124, the SMF network element sends the second QoS information of the first QoS flow to a UPF1.

The UPF1 receives the second QoS information of the first QoS flow sent by the SMF network element.

In step 125, the SMF network element generates an updated QoS detection request of the UPF1 according to the third QoS detection policy.

In step 126, the SMF network element sends the updated QoS detection request of the UPF1 to the UPF1.

In step 127, the UPF1 executes detection of the first QoS flow to detect a current UPF side RTT.

Exemplarily, the UPF1 receives the updated QoS detection request of the UPF1 sent by the SMF network element, and the UPF1 executes detection of the first QoS flow according to the updated QoS detection request of the UPF1 to detect the current UPF side RTT.

In step 128, the UPF1 reports a UPF side RTT overtime message to the PCF network element through the SMF network element.

Exemplarily, when the UPF1 detects that the current UPF side RTT exceeds the second user plane function side RTT threshold value, the UPF1 reports the UPF side RTT overtime message to the PCF network element through the SMF network element, and the UPF side RTT overtime message may include the current UPF side RTT exceeding the second user plane function side RTT threshold value.

In step 129, the UE may initiate a PDU session update flow.

Exemplarily, when the PCF network element receives the UPF side RTT overtime message reported by the UPF1, the UE may initiate the PDU session update flow, and in the PDU session update flow, the SMF network element reselects a new second UPF network element (namely a UPF2 shown in FIG. 12) to replace the UPF1.

In step 1210, the PCF network element generates a fourth PCC rule and a fourth QoS detection policy that meet the second user plane function side RTT threshold value.

In step 1211, the PCF network element issues the fourth PCC rule and the fourth QoS detection policy to the SMF network element.

In step 1212, the SMF network element generates third QoS information of the first QoS flow according to the fourth PCC rule.

In step 1213, the SMF network element sends the third QoS information of the first QoS flow to the UPF2.

The UPF2 receives the third QoS information of the first QoS flow sent by the SMF network element.

In step 1214, the SMF network element generates a QoS detection request of the UPF2 according to the fourth QoS detection policy.

In step 1215, the SMF network element sends the QoS detection request of the UPF2 to the UPF2.

In step 1216, the UPF2 executes detection of the first QoS flow to detect a current UPF side RTT between the UE and the UPF2.

Exemplarily, the UPF2 receives the QoS detection request of the UPF2 sent by the SMF network element, and the UPF2 executes detection of the first QoS flow according to the QoS detection request of the UPF2 to detect the current UPF side RTT between the UE and the UPF2. If the UPF2 detects that the current UPF side RTT between the UE and the UPF2 is smaller than or equal to the second user plane function side RTT threshold value, the target service flow may be transmitted on the UPF2; and if the UPF2 detects that the current UPF side RTT between the UE and the UPF2 is greater than the second user plane function side RTT threshold value, the second user plane function side RTT threshold value may be continued to be increased to obtain a third user plane function side RTT threshold value, the UPF2 redetects whether the current UPF side RTT between the UE and the UPF2 exceeds the third user plane function side RTT threshold value, and so on, until a target UPF network element that meets the round trip time request is found for transmitting the target service flow, or the target UPF network element that meets the round trip time request is not found, thereby interrupting the transmission of the target service flow.

Other contents of the embodiment of FIG. 12 may refer to other embodiments.

According to the data packet transmission method provided by the implementation of this disclosure, when the PCF network element learns that the current UPF side RTT between the UE and the UPF1 exceeds the first user plane function side RTT threshold value proposed by the AF network element, the corresponding target processing mode may be determined to meet the round trip time demand proposed by the AF network element as much as possible, and one of the meeting modes is to gradually increase the first user plane function side RTT threshold value until a network most suitable for transmitting the target service flow is found.

FIG. 13 is a flowchart of a data packet transmission method provided by an embodiment of this disclosure. The method provided by an embodiment of FIG. 13 may be executed by a PCF network element, but this disclosure is not limited to this.

As shown in FIG. 13, the method provided by this embodiment of this disclosure may include the following steps:

in step 1310, a round trip time request of a target service flow sent by an application function network element is received, the round trip time request including a first user plane function side round trip time threshold value. For example, a round trip time request of a service flow sent by an application function (AF) network element is received by a PCF network element, the round trip time request including a first user plane function (UPF) side round trip time threshold value.

In step 1320, in a case of agreeing with the round trip time request, a first policy and charging control rule and a first quality of service detection policy of a target service flow that meet the first user plane function side round trip time threshold value are generated, the first quality of service detection policy including the first user plane function side round trip time threshold value. For example, in response to a network exposure function (NEF) network element accepting the round trip time request, a first quality of service detection policy of the service flow that includes the first UPF side round trip time threshold value is generated by the PCF network element.

In an exemplary embodiment, the generating a first policy and charging control rule of the target service flow that meets the first user plane function side round trip time threshold value may include: determining an uplink service transmission delay threshold value and a downlink service transmission delay threshold value of a first user plane function side for a first quality of service flow according to the first user plane function side round trip time threshold value; and generating the first policy and charging control rule according to the uplink service transmission delay threshold value and the downlink service transmission delay threshold value of the first user plane function side for the first quality of service flow.

The first policy and charging control rule may include the uplink service transmission delay threshold value and the downlink service transmission delay threshold value of the first user plane function side for the first quality of service flow.

A sum of the uplink service transmission delay threshold value and the downlink service transmission delay threshold value of the first user plane function side for the first quality of service flow may be smaller than or equal to the first user plane function side round trip time threshold value.

The first quality of service flow may meet the uplink service transmission delay threshold value and the downlink service transmission delay threshold value of the first user plane function side for the first quality of service flow in first quality of service information.

The uplink service transmission delay threshold value of the first user plane function side for the first quality of service flow may be equal or not equal to the downlink service transmission delay threshold value.

In step 1330, the first policy and charging control rule and the first quality of service detection policy are sent to a session management function network element. For example, the first quality of service detection policy is sent by the PCF network element to a session management function (SMF) network element.

The first policy and charging control rule may be used for indicating the session management function network element to generate first quality of service information of the first quality of service flow to a first user plane function network element.

The first quality of service detection policy may be used for indicating the session management function network element to generate a quality of service detection request of the first user plane function network element and send the quality of service detection request of the first user plane function network element to the first user plane function network element.

The quality of service detection request of the first user plane function network element may be used for indicating the first user plane function network element to detect a current user plane function side round trip time of the target service flow between a terminal and the first user plane function network element, and report a user plane function side round trip time overtime message in a case that it is determined that the current user plane function side round trip time exceeds the first user plane function side round trip time threshold value.

The user plane function side round trip time overtime message may be used for indicating the policy control function network element to determine a target processing mode for the target service flow, so as to meet the round trip time request.

In step 1340, the user plane function side round trip time overtime message sent by the first user plane function network element is received.

In step 1350, the target processing mode for the target service flow is determined according to the user plane function side round trip time overtime message to meet the round trip time request.

In an exemplary embodiment, the round trip time request may further include a suggested processing mode after exceeding the first user plane function side round trip time threshold value.

The determining the target processing mode for the target service flow according to the user plane function side round trip time overtime message to meet the round trip time request may include: determining the target processing mode for the target service flow according to the suggested processing mode and/or a local policy of the policy control function network element.

In an exemplary embodiment, the method provided by this embodiment of this disclosure may further include: determining a first radio round trip time threshold value according to the first user plane function side round trip time threshold value; generating a second policy and charging control rule and a second quality of service detection policy of the target service flow that meet the first radio round trip time threshold value, where the second quality of service detection policy may include the first radio round trip time threshold value; and sending the second policy and charging control rule and the second quality of service detection policy to the session management function network element.

The second policy and charging control rule may be used for indicating the session management function network element to generate quality of service Profile file information of the first quality of service flow, and send the quality of service Profile file information of the first quality of service flow to a network device.

The second quality of service detection policy may be used for indicating the session management function network element to generate a quality of service detection request of the network device, and send the quality of service detection request of the network device to the network device.

The quality of service detection request of the network device may be used for indicating the network device to detect a current radio round trip time of the target service flow between a terminal and the network device, and report a radio round trip time overtime message in a case that it is determined that the current radio round trip time exceeds the first radio round trip time threshold value.

The method provided by this embodiment of this disclosure may further include: the radio round trip time overtime message reported by the network device through the session management function network element is received.

In an exemplary embodiment, the generating a second policy and charging control rule of the target service flow that meets the first user plane function side round trip time threshold value may include: determining an uplink service transmission delay threshold value and a downlink service transmission delay threshold value of a radio for the first quality of service flow according to the first radio round trip time threshold value; and generating the second policy and charging control rule according to the uplink service transmission delay threshold value and the downlink service transmission delay threshold value of the radio for the first quality of service flow.

The second policy and charging control rule may include the uplink service transmission delay threshold value and the downlink service transmission delay threshold value of the radio for the first quality of service flow.

A sum of the uplink service transmission delay threshold value and the downlink service transmission delay threshold value of the radio for the first quality of service flow is smaller than or equal to the first radio round trip time threshold value.

The first quality of service flow may meet the uplink service transmission delay threshold value and the downlink service transmission delay threshold value of the radio for the first quality of service flow in the quality of service Profile file information.

The uplink service transmission delay threshold value of the radio for the first quality of service flow may be equal to or not equal to the downlink service transmission delay threshold value.

In an exemplary embodiment, the user plane function side round trip time overtime message may include a current user plane function side round trip time exceeding the first user plane function side round trip time threshold value.

The target processing mode may include:
adjusting the first user plane function side round trip time threshold value according to the current user plane function side round trip time exceeding the first user plane function side round trip time threshold value to obtain a second user plane function side round trip time threshold value, the second user plane function side round trip time threshold value being greater than the first user plane function side round trip time threshold value;

indicating the first user plane function network element to detect a current user plane function side round trip time of the target service flow between the terminal and the first user plane function network element;

initiating an update process of a protocol data unit session in a case that it is determined that the current user plane function side round trip time of the target service flow between the terminal and the first user plane function network element exceeds the second user plane function side round trip time threshold value, so as to reselect a second user plane function network element;

indicating the second user plane function network element to detect a current user plane function side round trip time of the target service flow between the terminal and the second user plane function network element; and adopting, in a case that it is determined that the current user plane function side round trip time of the target service flow between the terminal and the second user plane function network element does not exceed the second user plane function side round trip time threshold value, the second user plane function network element to transmit the target service flow.

In an exemplary embodiment, the target processing mode may include at least one of the following:

continuing to transmit the target service flow to report a round trip time overtime message to an application function network element;

adjusting a configuration parameter of a network device;

reselecting the second user plane function network element to replace the first user plane function network element;

adjusting a quality of service rule and quality of service Profile file information of the target service flow to obtain an updated quality of service rule and updated quality of service Profile file information, and respectively sending the updated quality of service rule and the updated quality of service Profile file information to the terminal and the network device;

adjusting a round trip time threshold value parameter in quality of service detection of a first user plane function side to obtain the second user plane function side round trip time threshold value; and interrupting transmission of the target service flow.

In this embodiment of this disclosure, the PCF network element may determine the target processing mode when it is detected that the current UPF side RTT exceeds the first user plane function side RTT threshold value according to the suggested processing mode provided by the AF network element and/or the local policy of the PCF network element, and the target processing mode may be, for example, at least one of the following:

(1) continuing to transmit the target service flow and reporting a round trip time overtime message to the application function network element.

(2) Adjusting network configuration to ensure an RTT of a service, such as, adjusting a configuration parameter of the network device.

For example, the PCF network element may adjust the configuration parameter of a base station when it learns that the current UPF side RTT between UE and a UPF1 side exceeds the first user plane function side RTT threshold value, so as to meet the first user plane function side RTT threshold value. Specifically which configuration parameters of the base station being adjusted and how to adjust these configuration parameters of the base station may be determined according to actual service demands, which are not limited in this disclosure.

(3) Reselecting the second user plane function network element to replace the first user plane function network element.

For example, the AF network element may suggest the PCF network element to initiate a protocol data unit (PDU) session update flow when it learns that the current UPF side RTT between the UE and the UPF1 side exceeds the first user plane function side RTT threshold value, to reselect a new second UPF network element (represented by UPF2 below) to replace the UPF1, and then redetect whether the first user plane function side RTT threshold value is met on the new UPF2, and a specific detection process may refer to that of the UPF1. If it is detected on the new UPF2 that the first user plane function side RTT threshold value is still not met, the PDU session update flow may be continued to be initiated again to reselect a new third UPF network element to replace the UPF2, the above process is repeated until a target UPF network element that meets the first user plane function side RTT threshold value is found, and the target service flow is transmitted on a path of the target UPF network element.

(4) Adjusting a quality of service rule and quality of service Profile file information of the target service flow to obtain an updated quality of service rule and updated quality of service Profile file information, and sending the updated quality of service rule and the updated quality of service Profile file information to the terminal and the network device.

For example, the AF network element may suggest the PCF network element to adjust the QoS rule, QoS Profile file information and QoS information of the target service flow when it knows that the current UPF side RTT between the UE and the UPF1 side exceeds the first UPF side RTT threshold value to obtain updated QoS rule, QoS Profile file information and QoS information, and send the updated QoS rule to the UE, send the updated QoS Profile file information to the base station, send the updated QoS information to the UPF1, and then transmit the target service flow based on the updated QoS rule, so as to meet the target service flow, and specifically how to adjust the QoS rule may be determined according to the actual service demands, which is not limited in this disclosure.

(5) Adjusting a round trip time threshold value parameter (such as the above first user plane function side RTT threshold value) in quality of service detection of a first user plane function side to obtain a second user plane function side round trip time threshold value.

For example, the AF network element may suggest the PCF network element to increase the first user plane function side RTT threshold value to be the second user plane function side RTT threshold value according to the current UPF side RTT when it learns that the current UPF side RTT between the UE and the UPF1 side exceeds the first user plane function side RTT threshold value. For example, it is assumed that the first user plane function side RTT threshold value is 20 ms, the PCF network element may set the second user plane function side RTT threshold value as 30 ms, the UPF1 redetects the current UPF side RTT between the UE and the UPF1 according to the new second user plane function side RTT threshold value. If the current UPF side RTT between the UE and the UPF1 is smaller than or equal to 30 ms, the target service flow may still be transmitted on a path where the UPF1 is located, so that the target service flow may be continued to be transmitted on the UPF1 that meets 30 ms, and the impact of directly interrupting the transmission of the target service flow on a user is avoided. If the current UPF side RTT between the UE and the UPF1 is greater than 30 ms, the PDU session update flow may be initiated to reselect a new UPF2 to replace the UPF1, then whether the second user plane function side RTT threshold value is met is redetected on the new UPF2, and if it is detected on the new UPF2 that the second user plane function side RTT threshold value is met, the target service flow may be transmitted on a path where the UPF2 is located. If the second user plane function side RTT threshold value is still not met on the new UPF2, the PDU session update flow is continued to be initiated to reselect a new third UPF network element to replace the UPF2, the above process is repeated until a target UPF network element that meets the second user plane function side RTT threshold value is found, and the target service flow is transmitted on a path of the target UPF network element.

For another example, the AF network element may suggest the PCF network element to increase the first user plane function side RTT threshold value to be the second user plane function side RTT threshold value according to the current UPF side RTT when it learns that the current UPF side RTT between the UE and the UPF1 side exceeds the first user plane function side RTT threshold value. For example, it is assumed that the first user plane function side RTT threshold value is 20 ms, the PCF network element may set the second user plane function side RTT threshold value as 30 ms, the UPF1 redetects the current UPF side RTT between the UE and the UPF1 according to the new second user plane function side RTT threshold value, and if the current UPF side RTT between the UE and the UPF1 is greater than 30 ms, the PCF network element may continue to increase the second user plane function side RTT threshold value. For example, an obtained third user plane function side RTT threshold value is 40 ms, the UPF1 redetects the current UPF side RTT between the UE and the UPF1 according to the new third user plane function side RTT threshold value, if the current UPF side RTT between the UE and the UPF1 is smaller than or equal to 40 ms, the target service flow may still be transmitted on the path where the UPF1 is located, so that the target service flow may be continued to be transmitted on the UPF1 that meets 40 ms, and the impact of directly interrupting the transmission of the target service flow on the user is avoided. If the current UPF side RTT between the UE and the UPF1 is greater than 40 ms, the third user plane function side RTT threshold value may be continued to be increased, and so on. The user plane function side RTT threshold value may be gradually increased, and when the user plane function side RTT threshold value is increased to cause a situation that the target service flow cannot be applied in an actual scenario if it is continued to be transmitted at this time, the target service flow may be interrupted, so as to avoid the waste of network transmission resources. If the target service flow is switched to a normal service flow and may also be continued to be applied in the actual scenario, the target service flow may be switched to a network of the normal service flow with a user plane function side RTT threshold value being, such as 300 ms, for transmission.

(6) Interrupting transmission of the target service flow.

For some target service flows with high RTT requirements, if it is detected that the first user plane function side RTT threshold value proposed by the AF network element is not met, the PCF network element may also directly interrupt the transmission of the target service flow.

The target processing mode may also be a combination of adjusting the first user plane function side RTT threshold value and reselecting the second UPF network element, for example:

adjusting the first user plane function side round trip time threshold value according to the current user plane function side round trip time exceeding the first user plane function side round trip time threshold value to obtain the second user plane function side round trip time threshold value, the second user plane function side round trip time threshold value being greater than the first user plane function side round trip time threshold value;

indicating the first user plane function network element to redetect the current user plane function side round trip time of the target service flow between the terminal and the first user plane function network element;

initiating the update process of the protocol data unit session in the case that it is determined that the current user plane function side round trip time of the target service flow between the terminal and the first user plane function network element exceeds the second user plane function side round trip time threshold value, so as to reselect the second user plane function network element;

indicating the second user plane function network element to detect the current user plane function side round trip time of the target service flow between the terminal and the second user plane function network element; and adopting, in the case that the current user plane function side round trip time of the target service flow between the terminal and the second user plane function network element does not exceed the second user plane function side round trip time threshold value, the second user plane function network element to transmit the target service flow.

After the PCF network element receives the suggested processing mode provided by the AF network element, one or more of the suggested processing modes provided by the AF network element may be adopted as the target processing mode, or one or more of its local policies may be adopted as the target processing mode, or the target processing mode may be determined by comprehensively considering the suggested processing modes provided by the AF network element and its local policies. When the suggested processing modes provided by the AF network element conflict with its local policies, its local policies may be adopted as the target processing mode, which is not limited in this disclosure.

In this embodiment of this disclosure, when the target processing mode determined by the PCF network element is inconsistent with the suggested processing mode proposed by the AF network element, the PCF network element may send a notification message to the AF network element to inform it that the suggested processing mode suggested by the AF network element cannot be met, and further inform the AF network element of an actual target processing mode that may be adopted.

Other contents of the embodiment of FIG. 13 may refer to other embodiments above.

FIG. 14 is a flowchart of a data packet transmission method provided by an embodiment of this disclosure. The method provided by an embodiment of FIG. 14 may be executed by an SMF network element, but this disclosure is not limited to this.

As shown in FIG. 14, the method provided by this embodiment of this disclosure may include:

in step 1410, a first policy and charging control rule and a first quality of service detection policy of a target service flow that are sent by a policy control function network element and meet a first user plane function side round trip time threshold value are received, where the first quality of service detection policy may include the first user plane function side round trip time threshold value. For example, a first quality of service detection policy of a service flow sent by a policy control function (PCF) network element is received by the SMF network element. The first quality of service detection policy of the service flow includes a first user plane function (UPF) side round trip time threshold value.

In step 1420, first quality of service information of a first quality of service flow is generated according to the first policy and charging control rule, and the first quality of service information of the first quality of service flow is sent to a first user plane function network element.

In step 1430, a quality of service detection request of the first user plane function network element is generated according to the first quality of service detection policy, and the quality of service detection request of the first user plane function network element is sent to the first user plane function network element. For example, a quality of service detection request of a first UPF network element is generated by the SMF network element according to the first quality of service detection policy. The quality of service detection request is sent by the SMF network element to the first UPF network element, the quality of service detection request instructing the first UPF network element to report a UPF side round trip time overtime message when a current UPF side round trip time of the service flow between a terminal and the first UPF network element exceeds the first user plane function side round trip time threshold value.

In step 1440, a user plane function side round trip time overtime message is received. For example, the UPF side round trip time overtime message is received by the SMF network element.

In step 1450, the user plane function side round trip time overtime message is reported to the policy control function network element. For example, the UPF side round trip time overtime message is reported by the SMF network element to the PCF network element.

Other contents of the embodiment of FIG. 14 may refer to other embodiments above.

Figure 15:
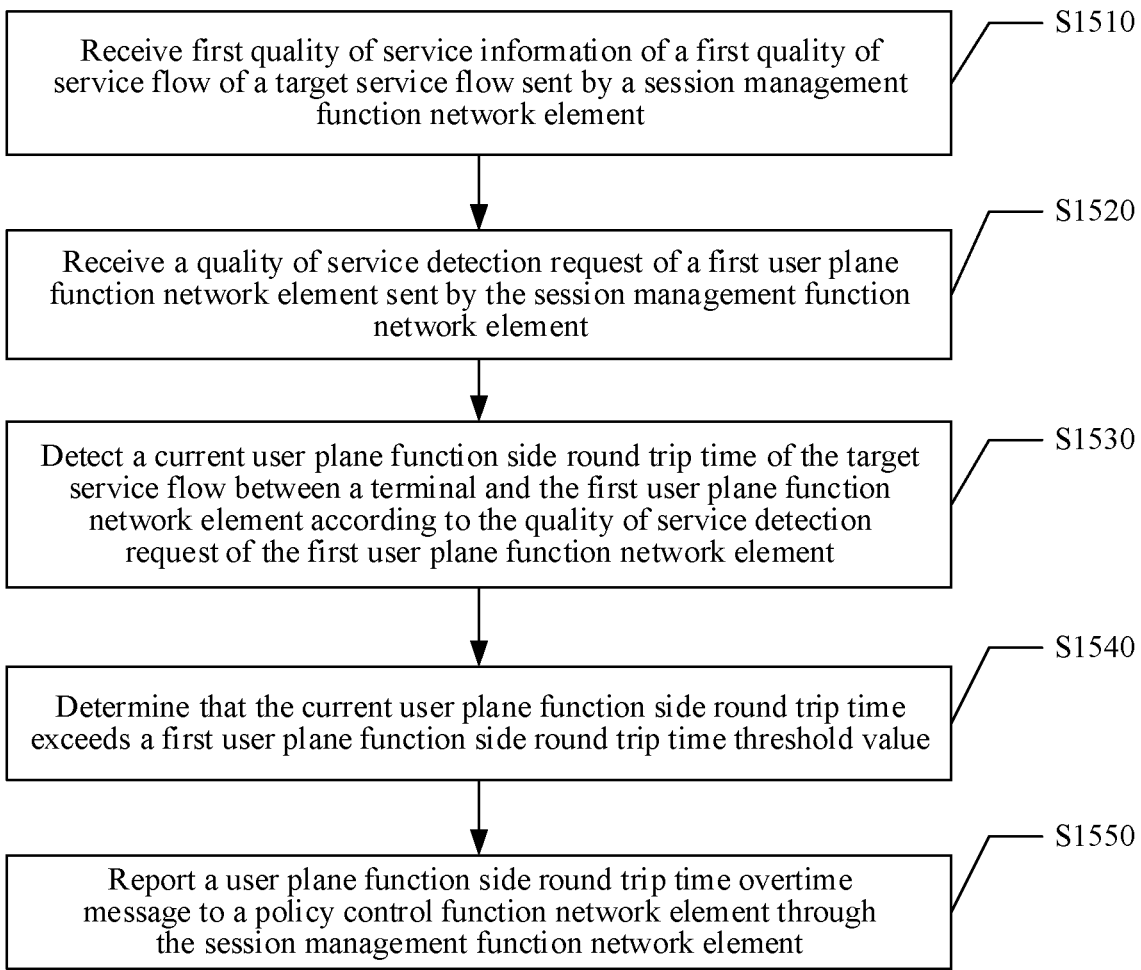
FIG. 15 is a flowchart of a data packet transmission method provided by an embodiment of this disclosure.

FIG. 15 is a flowchart of a data packet transmission method provided by an embodiment of this disclosure. The method provided by an embodiment of FIG. 15 may be executed by a first user plane function network element, but this disclosure is not limited to this.

As shown in FIG. 15, the method provided by this embodiment of this disclosure may include:

in step 1510, first quality of service information of a first quality of service flow of a target service flow sent by a session management function network element is received.

In step 1520, a quality of service detection request of the first user plane function network element sent by the session management function network element is received.

In step 1530, a current user plane function side round trip time of the target service flow between a terminal and the first user plane function network element is detected according to the quality of service detection request of the first user plane function network element.

In step 1540, it is determined that the current user plane function side round trip time exceeds a first user plane function side round trip time threshold value.

In step 1550, a user plane function side round trip time overtime message is reported to a policy control function network element through the session management function network element.

Other contents of the embodiment of FIG. 15 may refer to other embodiments above.

FIG. 16 is a flowchart of a data packet transmission method provided by an embodiment of this disclosure. The method provided by an embodiment of FIG. 16 may be executed by a network device, but this disclosure is not limited to this.

As shown in FIG. 16, the method provided by this embodiment of this disclosure may include:

in step 1610, quality of service Profile file information of a first quality of service flow of a target service flow sent by a session management function network element is received.

In step 1620, a quality of service detection request of the network device sent by the session management function network element is received.

In step 1630, a current radio round trip time of the target service flow between a terminal and the network device is detected according to the quality of service detection request of the network device.

In step 1640, it is determined that the current radio round trip time exceeds a first radio round trip time threshold value, the first radio round trip time threshold value being smaller than a first user plane function side round trip time threshold value.

In step 1650, a radio round trip time overtime message is reported to a policy control function network element through the session management function network element.

Other contents of the embodiment of FIG. 16 may refer to other embodiments above.

FIG. 17 is a block diagram of an application function network element provided by an embodiment of this disclosure.

As shown in FIG. 17, the application function network element 1700 provided by this embodiment of this disclosure may include a sending unit 1710 and a receiving unit 1720.

The sending unit 1710 is configured to send a round trip time request of a target service flow to a policy control function network element, and the round trip time request may include a first user plane function side round trip time threshold value.

The receiving unit 1720 is configured to receive a response message for the round trip time request, and the response message may include whether to agree with indication information of the round trip time request.

In an exemplary embodiment, the receiving unit 1720 may further be configured to: receive a round trip time overtime message.

Other contents of the embodiment of FIG. 17 may refer to other embodiments above.

Figure 18:
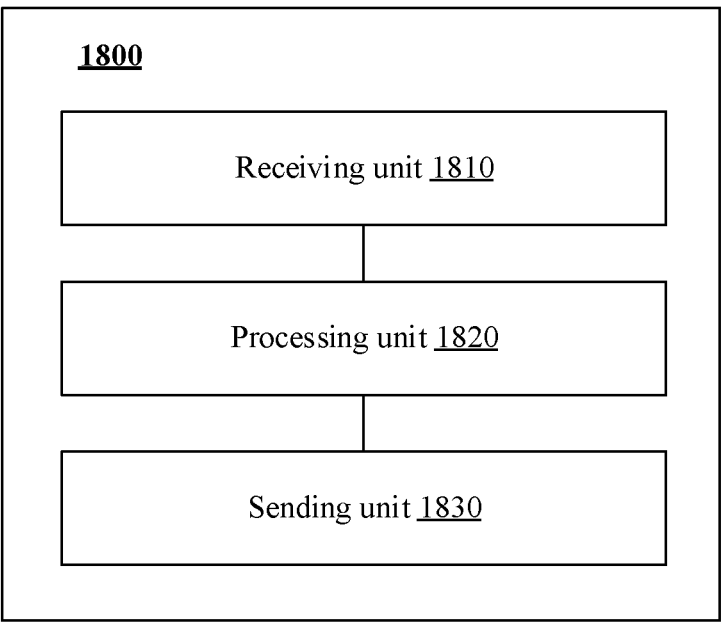
FIG. 18 is a block diagram of a policy control function network element provided by an embodiment of this disclosure.

FIG. 18 is a block diagram of a policy control function network element provided by an embodiment of this disclosure.

As shown in FIG. 18, the policy control function network element 1800 provided by this embodiment of this disclosure may include a receiving unit 1810, a processing unit 1820 and a sending unit 1830.

The receiving unit 1810 may be configured to receive a round trip time request of a target service flow sent by an application function network element, and the round trip time request may include a first user plane function side round trip time threshold value.

The processing unit 1820 may be configured to generate, in a case of agreeing with the round trip time request, a first policy and charging control rule and a first quality of service detection policy of the target service flow that meet the first user plane function side round trip time threshold value, and the first quality of service detection policy may include the first user plane function side round trip time threshold value.

The sending unit 1830 may be configured to send the first policy and charging control rule and the first quality of service detection policy to a session management function network element.

The receiving unit 1810 may further be configured to receive the user plane function side round trip time overtime message sent by the first user plane function network element.

The processing unit 1820 may further be configured to determine a target processing mode for the target service flow according to the user plane function side round trip time overtime message to meet the round trip time request.

In an exemplary embodiment, the processing unit 1820 may further be configured to: determine an uplink service transmission delay threshold value and a downlink service transmission delay threshold value of a first user plane function side for the first quality of service flow according to the first user plane function side round trip time threshold value; and generate a first policy and charging control rule according to the uplink service transmission delay threshold value and the downlink service transmission delay threshold value of the first user plane function side for the first quality of service flow, where the first policy and charging control rule may include the uplink service transmission delay threshold value and the downlink service transmission delay threshold value of the first user plane function side for the first quality of service flow.

The processing unit 1820 may further be configured to: determine the target processing mode for the target service flow according to the suggested processing mode and/or a local policy of the policy control function network element.

In an exemplary embodiment, the processing unit 1820 may further be configured to: determining a first radio round trip time threshold value according to the first user plane function side round trip time threshold value; generate a second policy and charging control rule and a second quality of service detection policy of the target service flow that meet the first radio round trip time threshold value, where the second quality of service detection policy may include the first radio round trip time threshold value. The sending unit 1830 may further be configured to: send the second policy and charging control rule and the second quality of service detection policy to the session management function network element.

The receiving unit 1810 may further be configured to: the radio round trip time overtime message reported by the network device through the session management function network element is received.

In an exemplary embodiment, the processing unit 1820 may further be configured to: determining an uplink service transmission delay threshold value and a downlink service transmission delay threshold value of a radio for the first quality of service flow according to the first radio round trip time threshold value; and generate a second policy and charging control rule according to the uplink service transmission delay threshold value and the downlink service transmission delay threshold value of the radio for the first quality of service flow, where the second policy and charging control rule may include the uplink service transmission delay threshold value and the downlink service transmission delay threshold value of the radio for the first quality of service flow.

Other contents of the embodiment of FIG. 18 may refer to other embodiments above.

Figure 19:
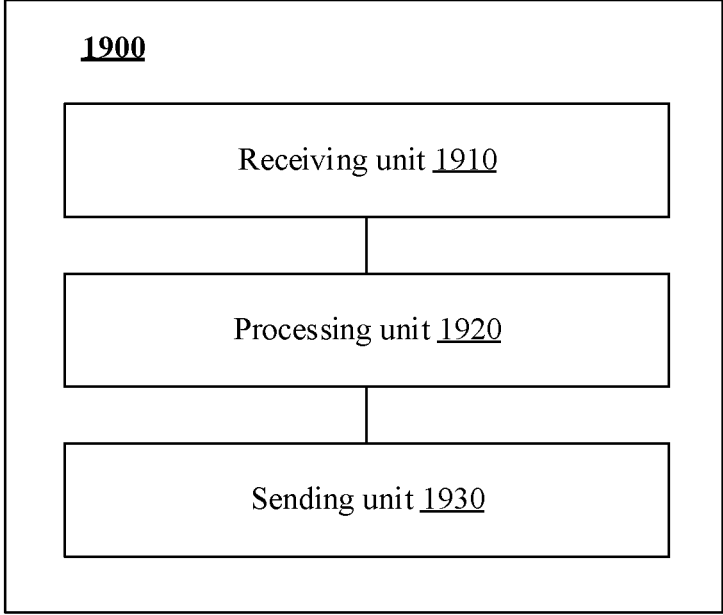
FIG. 19 is a block diagram of a session management function network element provided by an embodiment of this disclosure.

FIG. 19 is a block diagram of a session management function network element provided by an embodiment of this disclosure.

As shown in FIG. 19, the session management function network element 1900 provided by this embodiment of this disclosure may include a receiving unit 1910, a processing unit 1920 and a sending unit 1930.

The receiving unit 1910 may be configured to receive a first policy and charging control rule and a first quality of service detection policy of a target service flow that are sent by a policy control function network element and meet a first user plane function side round trip time threshold value, where the first quality of service detection policy may include the first user plane function side round trip time threshold value.

The processing unit 1920 may be configured to generate first quality of service information of a first quality of service flow according to the first policy and charging control rule.

The sending unit 1930 may be configured to send the first quality of service information of the first quality of service flow to a first user plane function network element.

The processing unit 1920 may further be configured to generate a quality of service detection request of the first user plane function network element according to the first quality of service detection policy.

The sending unit 1930 may further be configured to send the quality of service detection request of the first user plane function network element to the first user plane function network element.

The receiving unit 1910 may further be configured to receive a user plane function side round trip time overtime message.

The sending unit 1930 may further be configured to report the user plane function side round trip time overtime message to the policy control function network element.

In an exemplary embodiment, the receiving unit 1910 may further be configured to: receive a second policy and charging control rule and a second quality of service detection policy that meet a first radio round trip time threshold value from the policy control function network element.

The processing unit 1920 may further be configured to generate quality of service Profile file information of the first quality of service flow according to the second first policy and charging control rule.

The sending unit 1930 may further be configured to send the quality of service Profile file information of the first quality of service flow to a network device.

The processing unit 1920 may further be configured to generate a quality of service detection request of the network device according to the second first quality of service detection policy.

The sending unit 1930 may further be configured to send the quality of service detection request of the network device to the network device.

The receiving unit 1910 may further be configured to receive a radio round trip time overtime message.

The sending unit 1930 may further be configured to send the radio round trip time overtime message to the policy control function network element.

Other contents of the embodiment of FIG. 19 may refer to other embodiments above.

Figure 20:
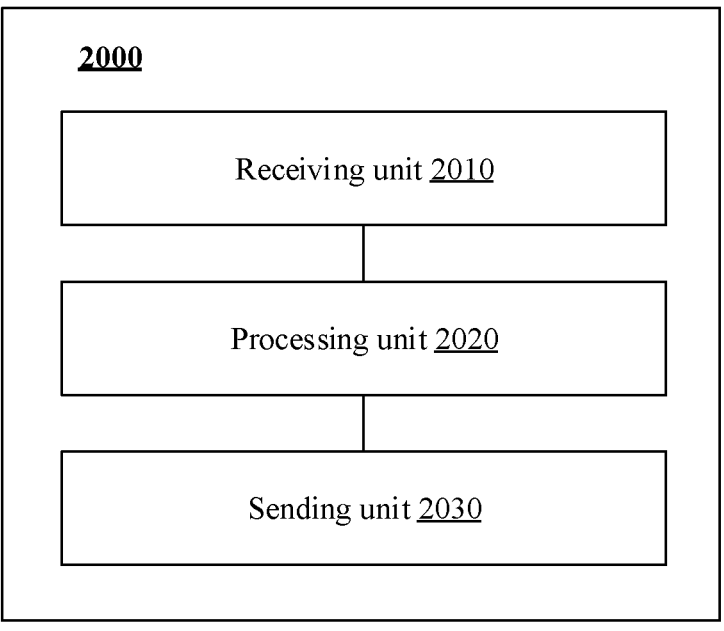
FIG. 20 is a block diagram of a first user plane function network element provided by an embodiment of this disclosure.

FIG. 20 is a block diagram of a first user plane function network element provided by an embodiment of this disclosure.

As shown in FIG. 20, the first user plane function network element 2000 provided by this embodiment of this disclosure may include a receiving unit 2010, a processing unit 2020 and a sending unit 2030.

The receiving unit 2010 may be configured to receive first quality of service information of a first quality of service flow of a target service flow sent by a session management function network element.

The receiving unit 2010 may further be configured to receive a quality of service detection request of the first user plane function network element sent by the session management function network element.

The processing unit 2020 may be configured to detect a current user plane function side round trip time of the target service flow between a terminal and the first user plane function network element according to the quality of service detection request of the first user plane function network element.

The processing unit 2020 may further be configured to determine that the current user plane function side round trip time exceeds a first user plane function side round trip time threshold value.

The sending unit 2030 may be configured to report a user plane function side round trip time overtime message to a policy control function network element through the session management function network element.

Other contents of the embodiment of FIG. 20 may refer to other embodiments above.

Figure 21:
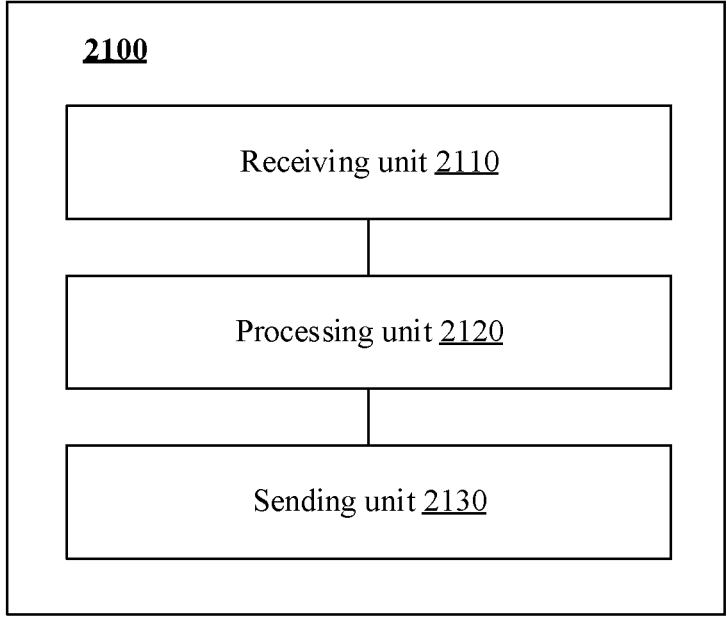
FIG. 21 is a block diagram of a network device provided by an embodiment of this disclosure.

FIG. 21 is a block diagram of a network device provided by an embodiment of this disclosure.

As shown in FIG. 21, the network device 2100 provided by this embodiment of this disclosure may include a receiving unit 2110, a processing unit 2120 and a sending unit 2130.

The receiving unit 2110 may be configured to receive quality of service Profile file information of a first quality of service flow of a target service flow sent by a session management function network element.

The receiving unit 2110 may further be configured to receive a quality of service detection request of the network device sent by the session management function network element.

The processing unit 2120 may be configured to detect a current radio round trip time of the target service flow between a terminal and the network device according to the quality of service detection request of the network device.

The processing unit 2120 may further be configured to determine that the current radio round trip time exceeds a first radio round trip time threshold value, and the first radio round trip time threshold value may be smaller than a first user plane function side round trip time threshold value.

The sending unit 2130 may be configured to report a radio round trip time overtime message to a policy control function network element through the session management function network element.

Other contents of the embodiment of FIG. 21 may refer to other embodiments above.

Figure 22:
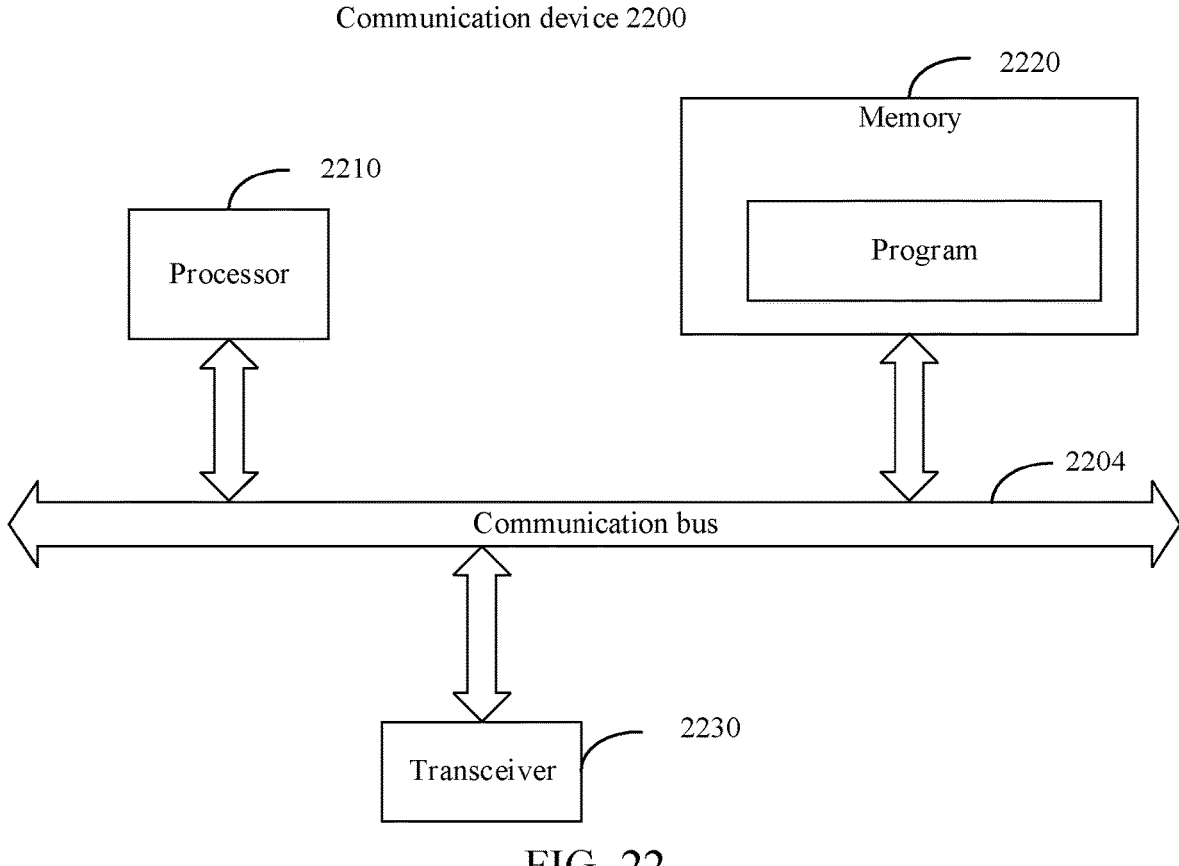
FIG. 22 is a schematic structural diagram of a communication device provided by an embodiment of this disclosure.

FIG. 22 is a schematic structural diagram of a communication device provided by an embodiment of this disclosure. The communication device may be a terminal, such as UE, may also be a network device, such as a base station, and may further be a PCF network element and/or an NEF network element and/or an AF network element and/or an AMF network element and/or an SMF network element and/or a UPF network element (which may include the above UPF1 and UPF2). The communication device 2200 shown in FIG. 22 includes a processor 2210 (processing circuitry), and the processor 2210 may call and run a computer program from a memory (non-transitory computer-readable storage medium) to implement the methods in the embodiments of this disclosure.

In some embodiments, as shown in FIG. 22, the communication device 2200 may further include a memory 2220. The processor 2210 may call and run the computer program from the memory 2220 to implement the methods in the embodiments of this disclosure.

The memory 2220 may be a separate device independent of the processor 2210 or integrated into the processor 2210.

In some embodiments, as shown in FIG. 22, the communication device 2200 may further include a transceiver 2230, the processor 2210 may control the transceiver 2230 to communicate with other devices, specifically, it may send information or data to other devices, or receive information or data sent by other devices.

The transceiver 2230 may include a transmitter and a receiver. The transceiver 2230 may further include an antenna, and there may be one or more antennas.

In some embodiments, the communication device 2200 may be various network elements of the embodiments of this disclosure, and the communication device 2200 may implement corresponding flows implemented by each network element in each method of the embodiments of this disclosure. For simplicity, it will not be repeated here.

In some embodiments, the communication device 2200 may be the network device of this embodiment of this disclosure, and the communication device 2200 may implement corresponding flows implemented by the network device in each method of the embodiments of this disclosure. For simplicity, it will not be repeated here.

In some embodiments, the communication device 2200 may be a mobile terminal/terminal of this embodiment of this disclosure, and the communication device 2200 may implement corresponding flows implemented by the mobile terminal/terminal in each method of the embodiments of this disclosure. For simplicity, it will not be repeated here.

The processor of this embodiment of this disclosure may be an integrated circuit chip, and has a signal processing capability. In an implementation process, steps of the above method embodiments may be completed by using a hardware integrated logic circuit in the processor or instructions in a form of software.

The above processor may be a general-purpose processor, a digital signal processor (DSP), an application specific integrated circuit (ASIC), a field programmable gate array (FPGA), or other programmable logic devices, discrete gate or transistor logic devices, and discrete hardware components, and may implement or execute the methods, the steps, and logic block diagrams that are disclosed in the embodiments of this disclosure. The general-purpose processor may be a microprocessor, or the processor may be any related processor or the like. The steps of the methods disclosed with reference to the embodiments of this disclosure may be directly executed and completed by using a hardware decoding processor, or may be executed and completed by using a combination of hardware and software modules in the decoding processor. The software module may be located in a storage medium that is mature in the art, such as a random access memory, a flash memory, a read-only memory, a programmable read-only memory, an electrically erasable programmable memory, or a register. The storage medium is located in the memory. The processor reads information in the memory and completes the steps of the methods in combination with hardware thereof.

It may be understood that the memory in this embodiment of this disclosure may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EE-PROM), or a flash memory. The volatile memory may be a random access memory (RAM) serving as an external cache. Through illustrative but not limited description, RAMs in many forms, for example, a static RAM (SRAM), a dynamic RAM (DRAM), a synchronous DRAM (SDRAM), a double data rate SDRAM (DDRSDRAM), an enhanced SDRAM (ESDRAM), a synch link DRAM (SLDRAM), and a direct rambus RAM (DRRAM), are available. The memory in the system and method described herein includes, but not limited to these memories and any other suitable types. The above memory is an illustrative but not limited description.

An embodiment of this disclosure further provides a computer-readable storage medium, configured to store a computer program.

For example, the computer-readable storage medium may be applied to a network device in the embodiments of this disclosure, and the computer program enables a computer to execute corresponding flows implemented by the network device in each method of the embodiments of this disclosure. For simplicity, it will not be repeated here.

For example, the computer-readable storage medium may be applied to each network element in the embodiments of this disclosure, and the computer program enables the computer to execute corresponding flows implemented by each network element in each method of the embodiments of this disclosure. For simplicity, it will not be repeated here.

For example, the computer-readable storage medium may be applied to a mobile terminal/terminal in the embodiments of this disclosure, and the computer program enables the computer to execute corresponding flows implemented by the mobile terminal/terminal in each method in the embodiments of this disclosure. For simplicity, it will not be repeated here.

An embodiment of this disclosure further provides a computer program product, including a computer program instruction.

For example, the computer program product may be applied to a network device in the embodiments of this disclosure, and the computer program instruction enables a computer to execute corresponding flows implemented by the network device in each method of the embodiments of this disclosure. For simplicity, it will not be repeated here.

For example, the computer program product may be applied to each network element in the embodiments of this disclosure, and the computer program instruction enables the computer to execute corresponding flows implemented by each network element in each method of the embodiments of this disclosure. For simplicity, it will not be repeated here.

For example, the computer program product may be applied to a mobile terminal/terminal in the embodiments of this disclosure, and the computer program instruction enables the computer to execute corresponding flows implemented by the mobile terminal/terminal in each method in the embodiments of this disclosure. For simplicity, it will not be repeated here.

An embodiment of this disclosure further provides a computer program.

For example, the computer program may be applied to a network device in the embodiment of this disclosure, and the computer program, when running on a computer, enables the computer to execute corresponding flows implemented by the network device in each method of the embodiments of this disclosure. For simplicity, it will not be repeated here.

For example, the computer program may be applied to each network element in the embodiments of this disclosure, and the computer program, when running on the computer, enables the computer to execute corresponding flows implemented by each network element in each method of the embodiments of this disclosure. For simplicity, it will not be repeated here.

For example, the computer program may be applied to a mobile terminal/terminal in the embodiments of this disclosure, and the computer program, when running on the computer, enables the computer to execute corresponding flows implemented by the mobile terminal/terminal in each method in the embodiments of this disclosure. For simplicity, it will not be repeated here.

A person of ordinary skill in the art may be aware that the exemplary units and algorithm steps described with reference to the embodiments disclosed herein can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this disclosure.

A person skilled in the art may clearly understand that, for simple and clear description, specific work processes of the above described systems, apparatuses and units may refer to corresponding processes in the above method embodiments, which will not be repeated here.

In several embodiments provided in this disclosure, it is to be understood that the disclosed systems, apparatuses and methods may be implemented in other manners. For example, the apparatus embodiments described above are merely schematic. For example, the unit division is merely logical function division and may be other division modes in actual implementation. For example, a plurality of units or components may be combined or integrated into another system, or some features may be ignored or not executed.

The units described as separate components may or may not be physically separate, and components displayed as units may or may not be physical units, that is, may be located in one position, or may be distributed on a plurality of network units. Some or all of the units may be selected according to actual needs to realize the objectives of the solutions of the embodiments.

In addition, all functional units in the embodiments of this disclosure may be integrated into one processing unit, or each of the units may exists physically alone, or two or more units may be integrated into one unit.

If implemented in the form of software functional units and sold or used as an independent product, the functions may be stored in a computer-readable storage medium. Based on such an understanding, the technical solutions of this disclosure essentially, or the part contributing to the related art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes: various media that can store program codes, such as a USB flash drive, a removable hard disk, a read-only memory (ROM), a random access memory (RAM), a magnetic disk, or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A data packet transmission method, comprising:
receiving, by a policy control function (PCF) network element, a round trip time request of a service flow sent by an application function (AF) network element, the round trip time request including a first user plane function (UPF) side round trip time threshold value;
generating, by the PCF network element, in response to a network exposure function (NEF) network element accepting the round trip time request, a first quality of service detection policy of the service flow that includes the first UPF side round trip time threshold value; and
sending, by the PCF network element, the first quality of service detection policy to a session management function (SMF) network element, wherein
in response to receiving the first quality of service detection policy, a quality of service detection request of a first UPF network element is generated and sent by the SMF network element to the first UPF network element;
in response to receiving the quality of service detection request of the first UPF network element, a UPF side round trip time overtime message is generated by the first UPF network element when a current UPF side round trip time of the service flow between a terminal and the first UPF network element exceeds the first UPF side round trip time threshold value; and
in response to receiving the UPF side round trip time overtime message, a processing mode is determined by the PCF network element for the service flow to meet the round trip time request.

2. The method according to claim 1, further comprising:
receiving, by the PCF network element, the UPF side round trip time overtime message sent by the first UPF network element; and
determining, by the PCF network element, the processing mode for the service flow according to the UPF side round trip time overtime message, the processing mode meeting the round trip time request.

3. The method according to claim 1, further comprising:
generating, by the PCF network element, in response to the NEF network element accepting the round trip time request, a first policy and charging control rule of the service flow that meets the first UPF side round trip time threshold value; and
sending, by the PCF network element, the first policy and charging control rule to the SMF network element.

4. The method according to claim 3, wherein the generating the first policy and charging control rule comprises:
determining, by the PCF network element, an uplink service transmission delay threshold value and a downlink service transmission delay threshold value for a first quality of service flow according to the first UPF side round trip time threshold value; and
generating, by the PCF network element, the first policy and charging control rule according to the uplink service transmission delay threshold value and the downlink service transmission delay threshold value for the first quality of service flow, wherein the first policy and charging control rule comprises the uplink service transmission delay threshold value and the downlink service transmission delay threshold value for the first quality of service flow, wherein
a sum of the uplink service transmission delay threshold value and the downlink service transmission delay threshold value for the first quality of service flow is smaller than or equal to the first UPF side round trip time threshold value.

5. The method according to claim 1, wherein
the round trip time request further comprises a suggested processing mode after exceeding the first UPF side round trip time threshold value; and
the PCF network element determines the processing mode for the service flow according to the UPF side round trip time overtime message by:
determining the processing mode for the service flow according to at least one of the suggested processing mode or a local policy of the PCF network element.

6. The method according to claim 1, further comprising:
determining, by the PCF network element, a first radio round trip time threshold value according to the first UPF side round trip time threshold value;
generating, by the PCF network element, a second policy and charging control rule and a second quality of service detection policy of the service flow that meet the first radio round trip time threshold value, the second quality of service detection policy comprising the first radio round trip time threshold value;
sending, by the PCF network element, the second policy and charging control rule and the second quality of service detection policy to the SMF network element; wherein
in response to receiving the second policy and charging control rule, quality of service Profile file information of a first quality of service flow is generated and sent, by the SMF network element, to a network device;
in response to receiving the second quality of service detection policy, a quality of service detection request of the network device is generated and sent, by the SMF network element, to the network device;
in response to receiving the quality of service detection request, a current radio round trip time of the service flow between the terminal and the network device is detected by the network device, and a radio round trip time overtime message is reported by the network device when the current radio round trip time exceeds the first radio round trip time threshold value; and the SMF network element is configured to receive the radio round trip time overtime message reported by the network device.

7. The method according to claim 6, wherein the generating the second policy and charging control rule comprises:

determining, by the PCF network element, an uplink service transmission delay threshold value and a downlink service transmission delay threshold value for the first quality of service flow according to the first radio round trip time threshold value; and generating, by the PCF network element, the second policy and charging control rule according to the uplink service transmission delay threshold value and the downlink service transmission delay threshold value for the first quality of service flow, wherein the second policy and charging control rule comprises the uplink service transmission delay threshold value and the downlink service transmission delay threshold value for the first quality of service flow, wherein a sum of the uplink service transmission delay threshold value and the downlink service transmission delay threshold value for the first quality of service flow is smaller than or equal to the first radio round trip time threshold value; and the quality of service Profile file information meets the uplink service transmission delay threshold value and the downlink service transmission delay threshold value for the first quality of service flow.

8. The method according to claim 1, wherein the UPF side round trip time overtime message comprises the current UPF side round trip time exceeding the first UPF side round trip time threshold value; and the processing mode comprises:

adjusting the first UPF side round trip time threshold value according to the current UPF side round trip time exceeding the first UPF side round trip time threshold value to obtain a second UPF side round trip time threshold value that is greater than the first UPF side round trip time threshold value;

instructing the first UPF network element to detect the current UPF side round trip time of the service flow between the terminal and the first UPF network element;

initiating an update process of a protocol data unit session in response to a determination that the current UPF side round trip time of the service flow between the terminal and the first UPF network element exceeds the second UPF side round trip time threshold value, so as to select a second UPF network element;

instructing the second UPF network element to detect a current UPF side round trip time of the service flow between the terminal and the second UPF network element; and adopting, in response to a determination that the current UPF side round trip time of the service flow between the terminal and the second UPF network element does not exceed the second UPF side round trip time threshold value, the second UPF network element to transmit the service flow.

9. The method according to claim 1, wherein the processing mode comprises at least one of:

continuing to transmit the service flow and to report a round trip time overtime message to the AF network element;

adjusting a configuration parameter of a network device;

selecting a second UPF network element to replace the first UPF network element;

adjusting a quality of service rule and quality of service Profile file information of the service flow to obtain an updated quality of service rule and updated quality of service Profile file information, and respectively sending the updated quality of service rule and the updated quality of service Profile file information to the terminal and the network device;

adjusting a round trip time threshold value parameter in quality of service detection of a first UPF side to obtain a second UPF side round trip time threshold value; or interrupting transmission of the service flow.

* * * * *